United States Patent
Siebers et al.

(10) Patent No.: US 11,267,748 B2
(45) Date of Patent: *Mar. 8, 2022

(54) TRANSPARENT COLOURED LITHIUM ALUMINIUM SILICATE GLASS CERAMIC AND PROCESS FOR PRODUCTION AND USE OF THE GLASS CERAMIC

(71) Applicant: SCHOTT AG, Mainz (DE)

(72) Inventors: Friedrich Siebers, Nierstein (DE); Oliver Hochrein, Mainz (DE)

(73) Assignee: SCHOTT AG, Mainz (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/228,894

(22) Filed: Dec. 21, 2018

(65) Prior Publication Data

US 2019/0194054 A1    Jun. 27, 2019

(30) Foreign Application Priority Data

Dec. 22, 2017 (DE) .......................... 102017131051.7
May 7, 2018 (DE) .......................... 102018110908.3

(51) Int. Cl.
*C03C 10/12* (2006.01)
*C03C 4/10* (2006.01)
(Continued)

(52) U.S. Cl.
CPC ...... *C03C 10/0027* (2013.01); *C03B 23/0305* (2013.01); *C03B 27/012* (2013.01);
(Continued)

(58) Field of Classification Search
CPC ..... C03C 10/00; C03C 10/027; C03C 3/0009; C03C 10/0009

See application file for complete search history.

(56) References Cited

U.S. PATENT DOCUMENTS 3,788,865 A    1/1974  Busdiecker
4,273,586 A    6/1981  Flannery
(Continued)

FOREIGN PATENT DOCUMENTS

DE    1796298    5/1972
DE    2705948    9/1977
(Continued)

OTHER PUBLICATIONS

D65 standard illuminant light, Wikipedia, 4 pages.
(Continued)

*Primary Examiner* — Karl E Group
(74) *Attorney, Agent, or Firm* — Ohlandt, Greeley, Ruggiero & Perle, L.L.P.

(57) ABSTRACT

A transparent coloured lithium aluminium silicate glass ceramic and method of producing are provided. The glass ceramic has a brightness Y of 0.1% to 80% at thickness 4 mm. The glass ceramic has a D65 standard illuminant light, after passing through the glass ceramic with thickness 4 mm, with a colour locus in a white region W1 determined by coordinates in a chromaticity diagram CIExyY-2°:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29. |

27 Claims, 9 Drawing Sheets

(51) Int. Cl.
| | |
|---|---|
| *F24C 15/10* | (2006.01) |
| *C03C 10/00* | (2006.01) |
| *C03C 3/087* | (2006.01) |
| *C03C 3/097* | (2006.01) |
| *C03C 1/00* | (2006.01) |
| *C03B 23/03* | (2006.01) |
| *C03B 27/012* | (2006.01) |
| *C03B 32/02* | (2006.01) |
| *C03C 3/083* | (2006.01) |
| *H05B 3/74* | (2006.01) |

(52) U.S. Cl.
CPC .............. *C03B 32/02* (2013.01); *C03C 1/002* (2013.01); *C03C 3/083* (2013.01); *C03C 3/087* (2013.01); *C03C 3/097* (2013.01); *C03C 4/10* (2013.01); *C03C 10/00* (2013.01); *F24C 15/10* (2013.01); *H05B 3/74* (2013.01)

(56) References Cited

U.S. PATENT DOCUMENTS

| | | | |
|---|---|---|---|
| 4,285,728 A | 8/1981 | Babcock | |
| 4,455,160 A | 6/1984 | Rittler | |
| 4,526,872 A | 7/1985 | Andrieu | |
| 5,010,041 A | 4/1991 | Koyama | |
| 5,179,045 A * | 1/1993 | Aitken | C03C 4/02 501/4 |
| 5,204,293 A | 4/1993 | Amundson, Jr. | |
| 5,256,600 A | 10/1993 | Pfitzenmaier | |
| 5,491,115 A | 2/1996 | Pfitzenmaier | |
| 8,198,201 B2 | 6/2012 | Comte | |
| 8,722,554 B2 | 5/2014 | Comte | |
| 8,765,619 B2 | 7/2014 | Brunet | |
| 9,018,113 B2 | 4/2015 | Siebers | |
| 9,156,727 B2 * | 10/2015 | Siebers | F24C 15/10 |
| 2003/0218001 A1 | 11/2003 | Siebers | |
| 2007/0004578 A1 | 1/2007 | Comte | |
| 2007/0108184 A1 | 5/2007 | Imamoto | |
| 2007/0129231 A1 | 6/2007 | Comte | |
| 2008/0026927 A1 | 1/2008 | Comte | |
| 2008/0090034 A1 | 4/2008 | Harrison | |
| 2008/0184740 A1 | 8/2008 | Waldschmidt | |
| 2008/0207424 A1 | 8/2008 | Aitken | |
| 2009/0018007 A1 | 1/2009 | Siebers | |
| 2009/0109373 A1 | 4/2009 | Taniguchi | |
| 2010/0047556 A1 | 2/2010 | Bockmeyer | |
| 2010/0130034 A1 | 5/2010 | Huang | |
| 2010/0130341 A1 | 5/2010 | Wondraczek | |
| 2010/0157585 A1 | 6/2010 | Diekmann | |
| 2010/0304944 A1 | 12/2010 | Comte | |
| 2010/0304948 A1 | 12/2010 | Comte | |
| 2011/0140843 A1 | 6/2011 | Nireki | |
| 2011/0226231 A1 | 9/2011 | Siebers | |
| 2012/0067865 A1 | 3/2012 | Siebers | |
| 2012/0085336 A1 | 4/2012 | Brunet | |
| 2013/0070451 A1 | 3/2013 | Mulet | |
| 2013/0098903 A1 | 4/2013 | Di Giovanni | |
| 2013/0164509 A1 | 6/2013 | Siebers | |
| 2013/0178353 A1 | 7/2013 | Comte | |
| 2013/0201678 A1 | 8/2013 | Siebers | |
| 2013/0286630 A1 | 10/2013 | Guiset | |
| 2013/0328946 A1 | 12/2013 | Zenker | |
| 2014/0009370 A1 | 1/2014 | Weiss | |
| 2014/0146530 A1 | 5/2014 | Guiset | |
| 2014/0146538 A1 | 5/2014 | Zenker | |
| 2014/0194270 A1 * | 7/2014 | Shiratori | C03C 3/097 501/32 |
| 2014/0238971 A1 | 8/2014 | Comte | |
| 2014/0356608 A1 | 12/2014 | Lentes | |
| 2015/0266770 A1 | 9/2015 | Miyasaka | |
| 2015/0266771 A1 | 9/2015 | Miyasaka | |
| 2015/0274579 A1 | 10/2015 | Plevacova | |
| 2016/0031755 A1 | 2/2016 | Hoppe | |
| 2016/0168018 A1 | 6/2016 | Gabel | |
| 2016/0176752 A1 | 6/2016 | Gabel | |
| 2016/0281961 A1 | 9/2016 | Laluet | |
| 2016/0334094 A1 | 11/2016 | Bach | |
| 2017/0016627 A1 | 1/2017 | Charpentier | |
| 2017/0023260 A1 | 1/2017 | Charpentier | |
| 2017/0052311 A1 | 2/2017 | Lautenschlager | |
| 2017/0139109 A1 | 5/2017 | Gierens | |
| 2017/0205552 A1 | 7/2017 | Gierens | |
| 2017/0215236 A1 | 7/2017 | Doerk | |
| 2019/0059131 A1 | 2/2019 | Debreyer | |
| 2019/0062201 A1 | 2/2019 | Weiss | |
| 2019/0194054 A1 | 6/2019 | Siebers | |
| 2019/0194060 A1 * | 6/2019 | Weiss | C03C 10/0009 |
| 2019/0194061 A1 * | 6/2019 | Weiss | C03C 4/10 |
| 2019/0194062 A1 * | 6/2019 | Wolfinger | C03C 4/10 |
| 2019/0194065 A1 * | 6/2019 | Henn | C03C 17/006 |
| 2019/0195510 A1 * | 6/2019 | Weiss | C03C 17/23 |
| 2019/0246788 A1 | 8/2019 | Demol | |
| 2020/0048144 A1 | 2/2020 | Guedon | |
| 2020/0189965 A1 | 6/2020 | Comte | |

FOREIGN PATENT DOCUMENTS

| | | | |
|---|---|---|---|
| DE | 2844030 | 4/1979 | |
| DE | 3345316 | 6/1984 | |
| DE | 3927174 | 2/1990 | |
| DE | 19939787 | 2/2001 | |
| DE | 102007036407 | 9/2008 | |
| DE | 102008031428 | 1/2010 | |
| DE | 102008040097 | 1/2010 | |
| DE | 102008050263 | 4/2010 | |
| DE | 102009013127 | 9/2010 | |
| DE | 102011050873 | 6/2012 | |
| DE | 202011110029 | 10/2012 | |
| DE | 102014226986 | 6/2016 | |
| DE | 102015103461 | 9/2016 | |
| DE | 102016101036 | 7/2017 | |
| DE | 102017101114 | 7/2017 | |
| DE | 102016103524 | 8/2017 | |
| DE | 202018100558 | 2/2018 | |
| EP | 1074520 | 2/2001 | |
| EP | 1465460 A2 * | 10/2004 | .............. C03C 4/02 |
| EP | 1398303 | 11/2005 | |
| EP | 1837312 | 9/2007 | |
| EP | 2435378 | 7/2014 | |
| EP | 3208545 | 8/2017 | |
| EP | 3049374 | 11/2017 | |
| FR | 3002532 | 8/2014 | |
| GB | 1562332 | 3/1980 | |
| GB | 2430249 | 2/2009 | |
| JP | H0551235 | 3/1993 | |
| JP | H11100229 | 4/1999 | |
| JP | H11100230 | 4/1999 | |
| JP | 6086311 | 3/2017 | |
| WO | 0216279 | 2/2002 | |
| WO | 2010013700 | 2/2010 | |
| WO | 2010102859 | 9/2010 | |
| WO | 2010137000 | 12/2010 | |
| WO | 2011089220 | 7/2011 | |
| WO | 2012010278 | 1/2012 | |
| WO | 2012076412 | 6/2012 | |
| WO | 2012076414 | 6/2012 | |
| WO | 2012168011 | 12/2012 | |
| WO | 2013124240 | 8/2013 | |
| WO | 2014170275 | 10/2014 | |
| WO | 2018224554 | 12/2018 | |
| WO | 2018224556 | 12/2018 | |

OTHER PUBLICATIONS

DIN EN 410, Apr. 2011, 66 pages.
DIN EN ISO 11664-4 "Colorimetry—Part 4: CIE 1976 L*a*b* colour space", Jun. 2012, 12 pages.
ASTM D1003-13, "Standard Test Method for Haze and Luminous Transmittance of Transparent Plastics", Nov. 15, 2013, 7 pages.
ISO 7991, "Glass—Determination of coefficient of mean linear thermal expansion", Dec. 15, 1987, 12 pages.

(56) References Cited

OTHER PUBLICATIONS

DIN 52324 (replaced by DIN ISO 7884-8), "Glass—Viscosity and viscometric fixed points—Part 8: Determination of (dilatometric) transformation temperature", Feb. 1998, 7 pages.
Glass Ceramic transmission: Schott Nextrema optical properties, Schott North America, Oct. 2017.
Le Bourhis, Glass Mechanics and Technology, Wiley-VCH GmbH & Co. KGaA, 2008.
"Schott Technical Glasses", Schott AG, Mainz, Oct. 2007.

* cited by examiner

TRANSPARENT COLOURED LITHIUM ALUMINIUM SILICATE GLASS CERAMIC AND PROCESS FOR PRODUCTION AND USE OF THE GLASS CERAMIC

CROSS REFERENCE TO RELATED APPLICATIONS

This application claims benefit under 35 USC § 119 of German Application 10 2017 131 051.7 filed Dec. 22, 2017 and German Application 10 2018 110 908.3 filed on May 7, 2018, the entire contents of both of which are incorporated herein by reference.

BACKGROUND

1. Field of the Invention

The invention also relates to processes for production thereof and to the use of such a glass ceramic.

2. Description of Related Art

It is generally known that glasses composed of the $Li_2O$-$Al_2O_3$-$SiO_2$ system can be converted to glass ceramics having high quartz mixed crystals (HQMC) or keatite mixed crystals (KMC) as main crystal phases. For the first type of glass ceramics the synonyms "β-quartz" or "β-eucryptite" can also be found in the literature as a description of the crystal phases, and for the second type "β-spodumene".

Key properties of these LAS glass ceramics are their transparency, good chemical stability to acids and alkalis, high mechanical strength, and their low coefficient of thermal expansion within a temperature range from room temperature to use temperature of $\alpha_{20/700} < 1.5 \cdot 10^{-6}$/K. In general, the thermal expansion characteristics are adjusted such that the materials have very low expansion in the region of their use temperatures, usually $0 \pm 1 \cdot 10^{-6}$/K. Owing to low thermal expansion at their use temperatures, combined with high mechanical strength, these glass ceramics have excellent temperature difference stability and thermal cycling stability. Demands for use at high temperatures include that the glass ceramics retain the required properties (for example thermal expansion, transmission, buildup of stresses) during their lifetime. With regard to thermal durability, the compaction of the glass ceramic, albeit minor, at high use temperatures is the critical parameter. Since the glass ceramic article is usually subject to non-uniform through-heating in use, stresses build up in the article with time as a result of the different degree of compaction.

The industrial scale production of LAS glass ceramics is effected in multiple stages. First of all, the crystallizable starting glass is melted from a mixture of shards and pulverulent batch raw materials and refined. The glass melt here reaches temperatures of 1550° C. to a maximum of 1750° C., usually up to 1700° C. In some cases, high-temperature refining above 1750° C. is also used, typically at temperatures around 1900° C. Arsenic oxide and antimony oxide are industrially and economically proven refining agents at conventional refining temperatures below 1700° C. with regard to good bubble qualities. More recent documents have also proposed the use of the eco-friendly refining agent $SnO_2$ alone or in combination with one or more refining additives such as halides (F, Cl, Br), $CeO_2$, $MnO_2$, $Fe_2O_3$, sulfur compounds.

After melting and refining, the glass typically undergoes hot forming by casting, pressing, rolling or floating. For many applications, the glass ceramics are required in flat form, for example in the form of sheets. Rolling and, more recently, floating as well are used for production of the plates. For the economically viable production of these LAS glasses, a low melting temperature and low working temperature $V_A$ in the hot forming are desired. Furthermore, the glass must not show any devitrification in the course of shaping, meaning that there must be no formation of relatively large crystals above about 5 μm that lower strength or are visually unappealing in the glass ceramic articles. Since the shaping takes place close to the working temperature $V_A$ (viscosity $10^4$ dPas) of the glass, it has to be ensured that the upper devitrification temperature of the melt is close to and preferably below the working temperature in order to avoid the formation of relatively large crystals.

The region which is critical in the shaping operation via rolling is the contact of the glass melt with the drawing die made of precious metal (typically made of a Pt/Rh alloy) before the glass is shaped by the rolls and cooled down. In floating, it is the contact of glass with the spout lip and the front region of the float bath in contact with the liquid Sn in which the glass has a high crystal growth rate.

The crystallizable LAS glass is converted to the glass ceramic by controlled crystallization (ceramization) in a subsequent thermal process. This ceramization is effected in a two-stage temperature process in which seeds, typically composed of $ZrO_2/TiO_2$ mixed crystals, are first produced by nucleation at a temperature between 680 and 800° C. $SnO_2$ is also involved in nucleation. The high quartz mixed crystals grow onto these seeds at elevated temperature. At the maximum production temperature of usually 850 to 960° C., the microstructure of the glass ceramic is homogenized, and the optical, physical and chemical properties are established. Short ceramization times are advantageous for economically viable production.

The further conversion to keatite mixed crystals is effected with increasing temperature within a temperature range of about 930° C. to 1250° C. The conversion increases the coefficient of thermal expansion of the glass ceramic. Within a transition range, transparent glass ceramics with keatite mixed crystals as main crystal phase are producible, usually with high quartz mixed crystals as secondary phase. When the temperature is increased further, there is further crystal growth, and the associated scattering of light results in a transformation of the appearance from transparent to translucent and further to opaque.

Transmission and scatter are important properties for the appearance and optical properties of glass ceramics.

One class of such glass ceramics is that of the transparent non-coloured glass ceramics. These glass ceramics are transparent since they have low scatter, and are not coloured since no colourants are added in the production thereof.

In the transparent non-coloured glass ceramics, high brightness is desired, i.e. high light transmittance. Therefore, the light transmittance of such glass ceramics at a thickness of 4 mm is more than 80%. However, transparent non-coloured glass ceramics have low intrinsic colour as a result of the impurities present in the batch raw materials, for example $Fe_2O_3$. This intrinsic colour is unwanted and is minimized by technical measures. For instance, as shown in EP 1837312 A1, it is possible to physically decolorize transparent non-coloured glass ceramics with a red/brown hue by doping with $Nd_2O_3$.

The transparent coloured glass ceramics differ from the transparent non-coloured glass ceramics in that transmission is lowered via the controlled addition of one or more colouring compounds that absorb in the visible. These colouring compounds as a constituent of the composition of a coloured glass ceramic thus increase the coefficient of absorption of the glass ceramic by comparison with a non-coloured glass ceramic. The resulting spectral progression of the transmission curve for a defined thickness gives rise to the colour of the glass ceramic and the brightness thereof.

Also used synonymously in the literature with the term "coloured glass ceramic" is the term "volume-coloured glass ceramic". Both terms emphasize the fact that the glass ceramic contains colouring constituents in its composition that affect the coefficient of absorption of the glass ceramic. Thus, these materials differ fundamentally from non-coloured glass ceramics that have a coloured coating for colouring of an article produced therefrom. Such a coating has no effect at all on the coefficient of absorption of the glass ceramic.

When used as a cooking surface, the brightness of the glass ceramic is typically limited to values of 1-5% in order to achieve a black appearance and in order to prevent unappealing transparency to technical components below the cooking surface. This range of values assures displaying capacity, usually with light-emitting diodes, and prevents dazzle by radiative heating elements. At higher brightness values above 2%, the value being dependent on the installations beneath the cooking surface and the lighting from above, a mask is typically applied, which is usually executed as an opaque underside coating. The regions for displays, display windows, sensors, illuminating projectors remain uncoated. In other applications, for example for glass ceramic dishware, a higher brightness than 5% is usually desired, combined with a particular shade. For the present transparent coloured glass ceramics, the brightness Y is up to 80%.

It is a characteristic feature that the colouring compounds in the crystallizable glass usually give a different colour from that in the glass ceramic produced therefrom. This is described, for example, in document US 3788865 for the colouring components NiO, $Fe_2O_3$, CoO, $Cr_2O_3$, MnO, CuO, ZnS, $V_2O_5$ individually and in combinations. The transmission curves adduced for the crystallizable glasses and the glass ceramics produced therefrom show that the glass ceramics, owing to their absorption bands, do not have flat transmission profiles in the visible.

The standard colouring by $V_2O_5$ is established in the ceramization of the crystallizable starting glasses. As shown in the earlier studies (DE 19939787 C2), a redox process is a prerequisite for the conversion of the vanadium oxide to the colouring state. In the crystallizable starting glass, the $V_2O_5$ still colours relatively weakly and leads to a pale greenish hue. In the ceramization, the redox process takes place; the vanadium is reduced and the redox partner is oxidized. The refining agent functions as the primary redox partner, generally antimony oxide, arsenic oxide or tin oxide. It can be assumed that the vanadium after the redox operation is partly in the reduced oxidation state as $V^{4+}$ or $V^{3+}$ and provides intense colour as a result of electron charge-transfer reactions. As well as the type and amount of redox partner in the starting glass, the redox state which is established in the melt in the glass also has an influence, for example by virtue of high melting temperatures and long residence times at high temperatures or as a result of additions of reducing components to the batch. A further influence on the colouring effect of vanadium oxide is possessed by the ceramization conditions. More particularly, high ceramization temperatures and longer ceramization times lead to more intense colouring.

Brightness is described by the Y value in the CIE standard colour system CIExyY with use of the D65 standard illuminant. The German implementation of the international CIE standard is stipulated in DIN 5033. Alternative terms in the literature for brightness are light transmission, integral transmission or light transmittance to DIN EN 410. The measured spectral values for the transmission, i.e. the spectral transmittances, in the range of 380 to 780 nm which represents the visible light spectrum, are used to calculate the brightness Y, and the colour coordinates x and y for an illuminant with a defined emission spectrum of the D65 standard illuminant, and an observer angle of 2°. Any light emitted by a light source has a colour locus with x and y coordinates within the spectral colour locus of the CIExyY colour space. For example, the colour locus of D65 standard illuminant light at an observer angle of 2° is x=0.31 and y=0.33.

Likewise within the colour space enclosed by the spectral colour locus is what is called the black-body curve. Every point on the black-body curve corresponds to the colour locus of the light emitted by a black-body radiator at a defined temperature. For example, the D65 standard illuminant by definition corresponds to a black-body radiator with a temperature of about 6500 K. This curve is of particular relevance to human perception since the sun likewise corresponds to a black-body radiator and hence the colour of sunlight is on the black-body curve. According to the position of the sun, the colour locus moves between cooler and warmer colour loci; a colour temperature of 20 000 K corresponds to a clear sky and a temperature of 3500 K to evening sunlight shortly before the commencement of dusk. Colour loci at or close to the black-body curve are therefore perceived as white and particularly natural.

A further peculiarity in the CIExyY colour space is what is called the achromatic point at x=0.33 and y=0.33. This colour locus corresponds to a theoretical light source that emits with the same intensity across the entire visible spectral range (standard illuminant E) and hence contains all spectral colours in equal proportions.

If light of a particular illuminant passes through a transparent coloured material, the transmitted light spectrum, owing to the typically different transmission of the material at different wavelengths, i.e. owing to different coefficients of absorption of the material at different wavelengths, will generally no longer correspond to that of the original illuminant. Thus, if the colour locus of light is measured before and after transmission through a transparent coloured material, what are more particularly being measured are different x and y colour coordinates. The material thus brings about a shift in the colour locus of the transmitted light. The sole exception from this is neutral density filters which, by definition, have the same spectral transmittance at any wavelength in the visible spectral region, i.e. a constant coefficient of absorption within this spectral region. When light passes through a neutral density filter, therefore, the x and y coordinates of the light are not altered, and the brightness Y is merely reduced.

For the present transparent coloured glass ceramics, the brightness Y with use of D65 standard illuminant and observation angle 2°, and the colour coordinates x, y are reported. Glass ceramics that move the colour locus of transmitted light only slightly are referred to hereinafter as "achromatic", "with low colour" or "with colour locus or coordinates close to the achromatic point". Particularly the wording "with colour locus close to the achromatic point" should be understood to mean that light of the standard illuminant E, after transmission through the glass ceramic, has a colour locus close to x=0.33 and y=0.33. "Close to" relates to a separation of not more than ±0.1.

Alternatively, it is possible to use the CIELAB colour system with the brightness L* and the colour coordinates a*, b*. A measure employed for colour is the parameter c* (chroma), according to the calculation:

$$c^* = \sqrt{(a^*)^2 + (b^*)^2}$$

The colour model is standardized in DIN EN ISO 11664-4 "Colorimetry—Part 4: CIE 1976 L*a*b* colour space". The coordinates of the CIELAB colour system can be calculated in a known manner from the colour coordinates x, y and the brightness Y of the CIE colour system. Owing to the aim of uniformity, CIELAB describes human colour perception better than the CIExyY colour system. In the CIELAB colour system, the difference ΔE is a measure of the colour distance between two colour loci $(L^*, a^*, b^*)_{i,j}$. The smallest colour distance that can still be perceived by the typical observer, depending on practice and adaptation time and also on illumination, is between 1 and 5. These relationships are applicable not only to measurement in transmission but also to that in reflectance, i.e. in top view.

$$\Delta E = \sqrt{(\Delta L^*)^2 + (\Delta a^*)^2 + (\Delta b^*)^2}$$

A common factor to both types of glass ceramic (transparent non-coloured and transparent coloured) is the requirement for low and visually inconspicuous scatter. Low scatter is essential in order that transparency to articles, any underside coatings, or viewing of light-emitting displays or screens disposed beneath the glass ceramic is not distorted, and the outlines are clearly and distinctly visible. Visual conspicuity of scatter can be assessed in a simple manner via assessment of the appearance of displays.

In the context of this document, the scatter of the glass ceramics is still determined by measuring haze. According to ASTM D1003-13, haze is the percentage of transmitted light that differs from the incident light beam by an average of more than 2.5°. Crucial factors for scatter are crystal size, differences in the refractive indices between crystals and remaining glass, and inclusions and inhomogeneities. At haze values greater than 10%, scatter is generally distorting and visually perceptible. For the assessment of the outline sharpness of displays, practical measurement with light-emitting displays is advisable in addition, since the perception of scatter also depends on other factors such as ambient lighting and the distance of the displays from the glass ceramic.

For a series of applications, for example as cooking surface, stove glass and sightglass, it is desirable that there is only a slight colour change, if any, when articles are viewed through it or in the case of light-emitting displays. Articles behind the glass ceramic are then visible in their true colours. The colour of polychromatic displays such as, in particular, white LEDs, RGB-LEDs, OLEDs, projectors, fluorescent tubes, displays and screens, is altered only slightly, if at all, on passage of the light through the glass ceramic. In the case of colour displays, usually in the form of LEDs, for example violet, blue, green, yellow, orange, red, that are essentially monochromatic, it is desirable that their intensities are not absorbed to different degrees when the light passes through. In that case, it is technically simpler and more economically viable to combine multiple LEDs having different colours since commercial LEDs can be used for correction of intensities without any special electronic actuation.

For the spectral transmission of the glass ceramic in the visible, these demands for a small change in colour mean a very flat profile of the curve without spectral regions having higher or lower transmission as typically caused by the absorption bands of the colouring compounds. Particularly the wavelength range from 470 to 630 nm, in which the human eye has higher perception sensitivity, is crucial here.

On the other hand, the colouring compounds, however, by virtue of their absorption, should ensure the brightness of the transparent coloured glass ceramic desired for the application. In that case, these desired glass ceramics have virtually colourless, grey appearance to the human observer.

By contrast with glass ceramics, it is possible in the case of glasses, owing to the different, broader absorption bands, to create the flat transmission profile and the grey hue. For instance, US 20150274579 A1 describes plates made of tempered glass for induction cooking surfaces. With the content of colouring compounds of 0.8-1.8% by weight of $Fe_2O_3$, 0.02-0.06% by weight of CoO, 0-0.005% by weight of Se and 0-0.1% by weight of $Cr_2O_3$, it is possible to produce the desired flat transmission profile between 430 and 630 nm and to produce a grey glass with light transmission of at most 10% at thickness 4 mm, which offers advantages for the white LED display. However, these colour oxides are unsuitable for the production of a grey glass ceramic since their colour effects in glass ceramics are different and they cannot generate a flat transmission profile.

Transparent coloured glass ceramics with low colour, i.e. those with low chroma c*, or colour coordinates close to the achromatic point and hence in a transparent neutral grey shade, are unknown from the prior art. The reason for this is that the absorption bands on crystallization become narrower and move unfavourably. For example, the CoO looks blue in the glass, and purple in the glass ceramic. Moreover, new absorption bands in the short-wave region of the spectrum arise in the glass ceramic as a result of intensely colouring Fe/Ti and Sn/Ti colour complexes.

For instance, JP H5051235 A2 describes a low-colour, i.e. grey, glass ceramic with brightness of not more than 75%, which, in the case of $Fe_2O_3$ contents of 0.08-0.8% by weight, is decolorized via high contents of $Nd_2O_3$ of 0.8-2% by weight, which is economically disadvantageous owing to the high costs of $Nd_2O_3$. Moreover, the desired flat transmission profile cannot be achieved owing to the narrow absorption bands of Nd.

Document DE 2844030 A1 describes a process for producing a transparent, tinted glass ceramic in which the natural and the amber-like intrinsic colour caused by oxides of titanium, of iron, of sodium and of potassium is first compensated for by addition of $Nd_2O_3$ and hence a grey glass ceramic is produced. By further addition of small amounts of molybdenum oxide, tungsten oxide and/or vanadium oxide, smoke grey, pale yellow or chestnut colours are achieved. The additions of the colour oxides in this glass ceramic lead away from the achromatic point in the yellow direction. This process also has disadvantages owing to the high costs and narrow absorption bands of $Nd_2O_3$.

A series of more recent publications describes the vanadium oxide-coloured glass ceramics for cooking surfaces with improved displaying capacity.

WO 2010102859 A1 discloses such a cooking surface. In order to provide a user of such a cooking surface with an improved operation display with distinctly improved information content, what is envisaged in accordance with the invention is that the glass ceramic has transmission values of greater than 0.1% in the visible light region over the entire wavelength range greater than 450 nm, a transmission of light in the visible of 0.8-5% and a transmission in the infrared at 1600 nm of 45-85%, that a display device is provided, and that the display device has a display unit designed so as to display different states of operation with different colours and/or symbols. In a preferred execution, instead of or in addition to the customary red displays, one or more multicolour displays such as blue, green, yellow, orange or white are used. The indicated transmission profile of the glass ceramics comes close to the demands for flat profile, but has the disadvantage that there is a steep rise in the spectral transmission in the long-wave spectral region from about 550 nm. As a result, the intensity of blue and green LEDs is reduced by the glass ceramic much more significantly than that of red LEDs. By virtue of the higher transmission in the long-wave region of the spectrum, the colour of the glass ceramic is moved in the red direction away from the white or achromatic point, and polychromatic displays, for example white LEDs, are changed in colour.

Transmission profiles that allow a display with blue LEDs are also exhibited by the vanadium oxide-coloured glass ceramics that are disclosed in documents WO 2010137000 A2 and US 2012085336 AA. In the first document, the glass ceramics at a thickness of 3 mm have a brightness between 1.5% and 5% and a transmission of greater than 0.5% for every wavelength between 450 and 480 nm. The second document discloses a glass ceramic plate which, at thickness 4 mm, has a transmission between 0.2% and 4% for every wavelength between 400 and 500 nm. These documents do not achieve the desired flat transmission profile either.

US 20130098903 A1 discloses a cooking device consisting of internal elements, including at least one heating means, control means and/or monitoring means and at least one light-emitting display that is not red, wherein the internal elements are covered by a plate of glass or vanadium-coloured glass ceramic. The plates have a light transmission of 2.3-40% and a spectral transmission of at least 0.6% for at least one wavelength between 420 and 480 nm. The cooking device has at least one covering means above, below or within it for covering the internal elements.

In these newer glass ceramic cooking surfaces with improved displaying capacity, $V_2O_5$ is used for colouring because it has the particular property of absorbing in the visible light region and permitting high transmission in the infrared radiation region. The rise in transmission in the long-wave region of the visible spectrum and the transmission profile that is therefore not flat have the disadvantage that the colour loci of the glass ceramic differ significantly from the white or achromatic point.

More particularly, it is not possible with the glass ceramics known from the prior art, in combination with industrially and economically available light-emitting elements such as white LEDs, displays, halogen lamps or the like, to produce lighting phenomena having a colour locus which, after transmission through the glass ceramic, lies in the region of the black-body curve at colour temperatures corresponding to those of sunlight.

In order to remedy this disadvantage of the prior art coloured glass ceramics, a series of additional technical measures has been developed.

Documents US 20140146530 A1, WO 2012076414 A1 and

WO 2012168011 A1 describe colour filters, or colour impression compensation filters, that are applied to the glass ceramic in the region of the displays and, by virtue of stronger absorption in the long-wave region of the spectrum, correct the colour of the combination of glass ceramic and filter in the direction of the white or achromatic point or to another desired colour locus. Thus, white LEDs and polychromatic displays and displays and screens are producible without colour distortion or with a corrected colour locus.

Document WO 2012076414 A1 gives a detailed description of transmission spectra and colour loci of variously coloured glass ceramic types (classes A to E in FIG. 1 and FIG. 2) for cooking surfaces according to the prior art in the CIE standard valence system CIExyY, 2°. For the transmitted light from displays, a preferred white region along the black-body curve is defined, which can be achieved only with the aid of such a compensation filter. The colour coordinates of these glass ceramic types according to the prior art are incorporated in the present invention in FIG. 1*b* as black crosses.

This solution is economically disadvantageous owing to the high complexity involved in the additional colour filters. There are technical disadvantages in the high scratch sensitivity of the filters and the risk of detachment, and in that these filters are generally unsuitable for regions with higher temperatures. In addition, these colour filters absorb and reduce the intensity of the poly- and monochromatic light transmitted, and thus worsen the energy efficiency of the overall system.

For colour correction adapted to a substrate with a spectrally inhomogeneous transmission profile and colour coordinates shifted away from the white point, WO 2012076412 A1, for example, also discloses electronic measures via colour-controllable lighting means or displays. The lighting means consists of at least two base colour light sources, with the base colour brightness corrected by at least one of the base colour light sources. Technical examples are, for example, colour-controllable RGB light-emitting diodes or electronically colour-corrected LCD and TFT displays. These measures too are economically disadvantageous owing to the costs of the electronic components together with actuation. Specifically in the case of displays, it is possible to undertake colour compensation by appropriate actuation, but only at the cost of the overall brightness of the display since the brightness of the more highly transmitted colours has to be reduced in relation to the more weakly transmitted colours. But in order then to arrive at the desired brightness of the display after transmission through the glass ceramic, it is necessary to use costly displays with very high luminance.

A further complex solution for correction of the colour changes in the passage of light from polychromatic displays through the vanadium oxide-coloured glass ceramics is disclosed in US 20160281961 A1. The article here contains a glass ceramic, a light source and a luminescent compound that form at least one luminescent surface on the cooking surface. The luminescent compound transforms the wavelength spectrum of the light source such that the light after passing through the glass ceramic has a desired colour locus.

In many of these applications, high IR transmission is also desired. According to the use, the demands for high IR transmission relate to different regions from the near IR at 800 nm up to wavelengths of 4 μm.

A characteristic IR absorption band for glass ceramics, which is tolerated by the applications, is in the range of 2700 to 3500 nm, which is attributable to the incorporation of water.

SUMMARY

It is an object of the invention to find a transparent coloured lithium aluminium silicate glass ceramic that overcomes the abovementioned disadvantages of the prior art.

The brightness of such a glass ceramic is to be adjustable within a wide range. Moreover, the glass ceramics are to be suitable for economically viable and eco-friendly production. This means that they should have good fusibility and refinability, low melting and shaping temperatures, and high devitrification resistance, and be ceramizable within short periods of time. The glass ceramics of the invention are to meet all further demands that are placed on the use thereof, for example: chemical stability, mechanical stability, thermal durability and high temperature/time durability with regard to changes in their properties, for example thermal expansion, transmission, buildup of stresses.

It is also an object of the invention to find a process for producing the glass ceramic and the use thereof.

The transparent coloured LAS glass ceramics of the invention have a brightness Y of 0.1% to 80%, i.e. of at least 0.1% and at most 80%, at thickness 4 mm, and are characterized in that D65 standard illuminant light, after passing through the glass ceramic with thickness 4 mm, has a colour locus in the white region W1 determined by the following coordinates in the chromaticity diagram CIExyY-2°:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29 |

The white region W1 is determined here as a region along the black-body curve in the CIExyY colour space that ranges from colour temperature about 2750 K to about 1 000 000 K and is shifted upward at the upper limit by a value of about y=0.04 relative to the black-body curve and downward at the lower limit by about y=0.07.

This results in the following effect: by definition, D65 standard illuminant light has a colour temperature of about 6500 K and, when observed directly by a 2° observer, a colour locus of x=0.31 and y=0.33. By the present invention, it is thus possible, on passage of light through the separating element, to shift the colour locus of the light essentially along the black body curve, either to higher or to lower colour temperatures, without producing an unwanted tint. After passing through the glass ceramic with a thickness of 4 mm, white light is thus still perceived as white light.

This is not possible with the glass ceramics having a transmission of at most 80% that are known from the prior art.

The colour locus of light after passage through the glass ceramic can be measured directly, for example, with the Konica Minolta CS-150 colorimeter. It is likewise possible to measure the transmission spectrum of the glass ceramic and to use this, with the aid of the known spectrum of D65 standard light and the eye sensitivity of a 2° normal observer in accordance with specifications of the CIE, to calculate the colour locus.

Display devices such as displays are typically adjusted, for example, such that they emit white light having a colour temperature of 5000 K (warm white), 6500 K (neutral white) or 9300 K (cold white). The article of the invention thus enables, with commercial displays without any need for further adjustments, production of a colour locus desired for displays in the light emitted by the display in the outer region of the article.

In a preferred embodiment, the glass ceramic is characterized in that D65 standard illuminant light, after passing through the glass ceramic with thickness 4 mm, has a colour locus in the white region W2 determined by the following coordinates in the chromaticity diagram CIExyY-2°:

| White region W2 | |
|---|---|
| x | y |
| 0.27 | 0.24 |
| 0.25 | 0.27 |
| 0.32 | 0.36 |
| 0.41 | 0.42 |
| 0.42 | 0.36 |
| 0.35 | 0.31 |

The white region W2 is determined here as a region along the black-body curve in the CIExyY colour space that ranges from colour temperature about 3,500 K to about 20 000 K and is shifted upward at the upper limit by a value of about y=0.025 relative to the black-body curve and downward at the lower limit by about y=0.04.

By comparison with W1, this region thus extends along a shorter section of the black-body curve that corresponds to the region of colour loci of natural sunlight and additionally has a smaller deviation in the x and y coordinates from the black-body curve. White light that passes through such a glass ceramic is therefore perceived as being particularly white and natural.

More preferably, the glass ceramic is characterized in that D65 standard illuminant light, after passing through the glass ceramic with thickness 4 mm, has a colour locus in the white region W3 that extends along the black-body curve in the CIExyY colour space from colour temperature of about 5000 K to about 20 000 K and is shifted upward at the upper limit by a value of about y=0.025 relative to the black-body curve and downward at the lower limit by about y=0.04. The white region W3 thus corresponds essentially to region W2, but begins only at a colour temperature of 5000 K. This colour region corresponds to daylight white and is correspondingly perceived by the human observer as particularly pure white, especially as cold white:

| White region W3 | |
|---|---|
| x | y |
| 0.250 | 0.270 |
| 0.290 | 0.320 |
| 0.340 | 0.370 |
| 0.360 | 0.320 |
| 0.310 | 0.280 |
| 0.270 | 0.240 |

Such a colouring effect can be achieved, for example, in that the transparent coloured LAS glass ceramics contain 0.003-0.5% by weight of $MoO_3$ as colouring component. A minimum content of 0.003% by weight is required in the case of colouring by means of $MoO_3$ in order to obtain the reduced colour, i.e. chromaticity. If lower brightness is desired or, with increasing $Fe_2O_3$ or $V_2O_5$ contents, higher $MoO_3$ contents are required since these colouring components respectively move the colour coordinates away from the achromatic point into the yellow and orange/red. Preferably, for establishment of the colour locus close to the achromatic point, at least 0.01%, further preferably at least 0.03% and more preferably at least 0.05% by weight of $MoO_3$ is present. Since different valences of the Mo atom are present in the glass ceramic, the stated contents of the composition are based analytically on this compound. As the upper limit, the $MoO_3$ content is 0.5%, preferably 0.3%, further preferably 0.25% and more preferably 0.2% by weight.

It has been found that the addition of $MoO_3$ brings about lowering of the glass viscosity and is favourable for the fusibility of the glass. However, particularly the reduced molybdenum oxide species also act as nucleating agents and can worsen the devitrification stability. It is therefore advantageous to limit the content.

The glass ceramics preferably contain less than 0.2% by weight of $Nd_2O_3$ since, in the case of this colour oxide, the low colour is achieved by narrow absorption bands at wavelengths of 526, 584 and 748 nm. With a high content of $Nd_2O_3$, this does not lead to a flat transmission profile, with the disadvantage that the colour coordinates of the glass ceramic differ relatively significantly from the standard illuminant used. In the case of polychromatic displays or screens, the wavelength ranges described are strongly absorbed on passage through the glass ceramic. The preferred content of $Nd_2O_3$ is less than 0.12% by weight and further preferably less than 0.06% by weight. More preferably, no $Nd_2O_3$ is used and the glass ceramic is free of $Nd_2O_3$ for technical purposes. In that case, generally less than 10 ppm of impurities is present. This effect occurs independently of the addition of other colourants. Therefore, the glass ceramics contain, independently of the other colouring constituents, preferably less than 0.2% by weight of $Nd_2O_3$.

In a preferred embodiment, the glass ceramics therefore contain 0.003-0.5% by weight of $MoO_3$ as colouring component or less than 0.2% by weight of $Nd_2O_3$. In a particularly preferred embodiment, the glass ceramics therefore contain 0.003-0.5% by weight of $MoO_3$ as colouring component and less than 0.2% by weight of $Nd_2O_3$. By virtue of this combination of $MoO_3$ and $Nd_2O_3$, it is possible to achieve particularly colour-neutral glass ceramics over a wide brightness range.

The chroma $c^*$, measured in transmission, in the CIELAB colour system for glass ceramics of the invention is preferably at most 21, more preferably at most 15 and especially at most 7.

The colour coordinates here are to be preferably $a^*=0\pm17$, $b^*=0\pm17$, further preferably $a^*=0\pm12$, $b^*=0\pm12$, further preferably $a^*=0\pm8$, $b^*=0\pm8$ and especially preferably $a^*=0\pm6$, $b^*=0\pm6$, and hence are not to deviate significantly from the achromatic axis.

The values for the colour coordinates relate to polished samples of thickness 4 mm and D65 standard light, 2°.

The greater the chroma $c^*$ based on 4 mm, the greater the shift in the colour coordinates of a glass ceramic with changes in thickness. Preference is given to a glass ceramic for which, for the entire thickness range from 2 to 12 mm or at least 2.5 to 6 mm, the limits of the invention for the chroma $c^*$ are observed.

Alternatively, the low colour can also be represented in the CIExyY colour system, in which, however, colour contrasts about a colour locus that are perceived to be the same lie not on a circle but on what are called the MacAdams ellipses. The colour coordinates, measured in transmission, of the glass ceramics of the invention, for a thickness of 4 mm, are close to the white or achromatic point in the CIExyY colour system. The preferred limits $\alpha x=\pm0.13$ and $\Delta y=\pm0.10$ are a good approximation.

For D65 standard light, 2°, the colour locus is at x=0.3127 and y=0.3290. The colour locus of D65 standard light, 2°, is also referred to as the white point. Therefore, the limits for the colour locus in preferred embodiments of the glass ceramic are at $0.1827 \leq x \leq 0.4427$ and $0.2290 \leq y \leq 0.4290$. Colour coordinates that are even closer to the white point with tighter limits of $\Delta x=\pm0.08$ and $\Delta y=\pm0.06$ and further preferably between $\Delta x=\pm0.05$ and $\Delta y=\pm0.04$ are advantageous for true-colour transmission of light through the glass ceramic. In the case of such glass ceramics, there are at most insignificant changes in the colour locus of transmitted light.

For other standard illuminants, the position of the respective white point moves and for standard light C, for example, is at x=0.309 and y=0.319, and for standard light A at x=0.448 and y=0.407. The upper and lower limits for the preferably achievable colour coordinates should be adjusted according to illumination with the specified tolerances.

The distance d of the colour locus (x,y) of the glass ceramic from the white or achromatic point correlates with the colour and is specified hereinafter for various working examples. For the distance d on measurement with D65 standard light, 2°:

$$d=\sqrt{(x-0.3127)^2+(y-0.3290)^2}$$

The transparent coloured glass ceramics of the invention have low, visually imperceptible scatter in transparency to articles or in the viewing of light emitting displays or screens disposed beneath the glass ceramic. In the measurement of haze, they are preferably characterized by a haze value of less than 10%, preferably less than 6%, further preferably less than 4% and more preferably less than 2.5%. An additional practical measurement of the visual appearance of light-emitting displays is advantageous for the practical assessment of the glass ceramics for use as a cooktop.

Preferably, the transparent coloured lithium aluminium silicate glass ceramics of the invention have a flat curve profile of the spectral transmittance in the visible light region of 470 to 630 nm. Within this wavelength range, the sensitivity of the human eye is relatively high with the maximum at 555 nm, and the limits are characteristic of the wavelengths of blue (470 nm) and red LED displays (630 nm). The flat transmission profile assures low-colour or undistorted display with white LEDs that are polychromatic. Moreover, displays, screens, e.g. TFT screens, with low colour change are also indicated. Light transmitted through glass ceramic articles is subject to little colour change for the various uses and corresponds to an optical grey filter. The flat transmission profile has the advantage that the colour coordinates of the glass ceramic depend to a minor degree on the thickness of the article.

The flat profile of the transmission curve preferably features a ratio of the highest to the lowest spectral transmittance in the wavelength range of 470 to 630 nm of not more than 2.5, preferably not more than 2, further preferably not more than 1.8.

Moreover, the flat transmission profile should preferably not contain any narrow absorption bands as characteristic of $Nd_2O_3$ for example, in which the transmission values of adjacent wavelengths are distinctly different. In the wavelength range of 470 to 680 nm, the spectral transmittances within all ranges encompassing 50 nm should preferably differ by less than a factor of 2.0, further preferably less than 1.7 and more preferably less than 1.5.

The progression of the transmission curve in the infrared and UV in the case of the $MoO_3$-coloured glass ceramics of the invention fulfils the demands that result from the glass ceramic applications based on the established display-capable vanadium oxide-coloured glass ceramics.

Over the entire wavelength range of 950 nm to 2500 nm, the spectral transmittance preferably does not go below 25%. Preferably, transmission in this region is at least 30% and more preferably at least 40% for thickness 4 mm. In this wavelength range, in cooking surfaces for example, infrared sensors are used to detect the temperature of the pan base.

At a wavelength of 1600 nm, the infrared transmission, i.e. the spectral transmittance at 1600 nm, is to be more than 40%. Preferably, infrared transmission is 45-85% at 1600 nm and a thickness of 4 mm. More preferably, infrared transmission at 1600 nm has values of 50-80%. Thus, the demands associated with radiation-heated glass ceramic cooking surfaces for high initial cooking rate and protection from impermissible heating of the environment of the cooking surface are fulfilled.

For glass ceramic stove glasses, the stated transparency of infrared radiation is desired in order to enhance the experience of the stove fire.

As in the case of established vanadium oxide-coloured glass ceramics, in the far IR, a transmission window between about 3 and 4.3 μm is desired since IR sensors are used here too in cooking surfaces. In the far infrared at 3700 nm, infrared transmission of at least 30%, preferably at least 40%, as in the case of established glass ceramics is advantageous.

In the ultraviolet light region, the glass ceramics of the invention are likewise to assure lasting protection. This means that transmission at wavelengths less than 300 nm is to be much less than 0.1%.

All figures relating to transmission in the IR and UV relate again to 4 mm polished samples and measurement with D65 standard light, 2°.

It has been found that colouring with molybdenum oxide is also based on a redox process. In the crystallizable starting glass, the $MoO_3$ still colours relatively weakly. As is being assumed, the redox process takes place in the ceramization: the molybdenum is reduced and the redox partner is oxidized, e.g. $Sn^{2+}$ to $Sn^{4+}$. The studies have shown that a stronger redox reaction is required for colouring with molybdenum than for colouring with vanadium. Therefore, preference is given to the more strongly reducing refining agent $SnO_2$ in contents of 0.05-0.8% by weight. Lower contents are less effective for the refining; higher contents promote unwanted devitrification in the course of shaping through Sn-containing crystals. Preferably, the $SnO_2$ content is 0.1% to <0.7% by weight. More preferably, the $SnO_2$ content is below 0.6% by weight. Colouring with other refining agents as redox partner, such as antimony oxide or arsenic oxide, is found to be less effective.

Since colouring by molybdenum oxide is a redox process, the redox state which is established in the melt in the glass also has an influence, for example by virtue of high melting temperatures and long residence times at high temperatures or additions of reducing components. A further influence on the colouring effect is possessed by the ceramization conditions. More particularly, high ceramization temperatures and longer ceramization times lead to more intense colouring. Additions of other polyvalent components such as $Fe_2O_3$, $V_2O_5$, $CeO_2$, $TiO_2$ can, as well as their own colouring effect, influence the redox process and hence influence the molybdenum oxide colouring with regard to brightness and colour coordinates of the glass ceramic.

The $Fe_2O_3$ component reduces colouring by $MoO_3$ and shifts the colour locus in the CIELAB colour system to higher b* values, i.e. into the yellow. Higher contents than 0.25% by weight are therefore unfavourable. Preferably, the $Fe_2O_3$ content is not more than 0.15% by weight and more preferably not more than 0.1% A by weight. Owing to the high costs of low-iron raw materials, it is uneconomic to reduce the $Fe_2O_3$ content to values below 0.005% by weight. A preferred lower limit is a content of greater than 0.03% by weight and more preferably greater than 0.05% by weight.

The $V_2O_5$ component shifts the colour locus into the orange/red, i.e. to higher a*, b* values, and to higher x values in the CIE colour system. The component is suitable for combination colouring with $MoO_3$. However, $V_2O_5$ colours more intensely, and so the content preferably has to be limited in order to achieve minimum chroma c*. Higher contents than 0.02% by weight are therefore unfavourable. Preferably, the $V_2O_5$ content is less than 0.015% by weight and further preferably not more than 0.01% by weight. More preferably, no $V_2O_5$ is added to the composition and only impurities of a few ppm, usually 1-15 ppm, are present in the glass ceramic. The molybdenum oxide is thus the main colourant and the following component relationship is applicable (in % by weight): $MoO_3/V_2O_5>1$, preferably >3, further preferably >5 and more preferably >10.

$TiO_2$ is an advantageous component for the nucleation. Since colouring is also assisted by the molybdenum oxide, meaning that the addition leads to lower values of light transmission Y, a minimum content of greater than 1.6% by weight is preferred. Preference is given to a minimum content of 2.5%, further preferably of 3% and more preferably of 3.5% by weight.

$TiO_2$ is thus preferably the most important nucleator, and the following component relationship is applicable (in % by weight): $TiO_2/ZrO_2>1$, preferably >2, further preferably >3.

As well as the abovementioned polyvalent colouring components $Fe_2O_3$ and $V_2O_5$, it is also possible to use further colouring components, for example chromium compounds, manganese compounds, cobalt compounds, nickel compounds, copper compounds, tantalum compounds, niobium compounds, cerium compounds, tungsten compounds, bismuth compounds, selenium compounds, rare earth compounds, sulfide compounds, in order to adjust the colour coordinates of the glass ceramic. A special status is assumed here by polyvalent elements since they can additionally affect the redox operation that leads to colouring of the molybdenum. The content of colouring components is preferably limited to amounts of not more than 2% by weight, further preferably below 1% by weight. Moreover, these compounds can lower transmission in the infrared and should therefore preferably be limited. FIG. 1a shows, in schematic form, the direction of the shifts in the colour locus of an $MoO_3$-coloured glass ceramic with addition of selected colouring components in the CIE colour system.

The $Cr_2O_3$ content is preferably less than 0.02% by weight, more preferably less than 0.01% by weight, and the glass ceramic is especially free of $Cr_2O_3$ apart from unavoidable impurities.

In a preferred embodiment, the lithium aluminium silicate glass ceramic of the invention, or the article produced therefrom, contains the following components (in % by weight based on oxide):

| | |
|---|---|
| $Li_2O$ | 2-5.5 |
| $Al_2O_3$ | 16-26 |
| $SiO_2$ | 58-72 |
| $MoO_3$ | 0.003-0.5 |

The oxides $Li_2O$, $Al_2O_3$ and $SiO_2$ within the specified limits are necessary constituents of the high quartz and/or keatite mixed crystal phases.

The $Li_2O$ content should preferably be 2% to 5.5% by weight. The minimum content is required for the formation of crystals with low thermal expansion, but higher contents than 5.5% by weight in the production process frequently lead to unwanted devitrification. Preferably, the $Li_2O$ content is greater than 2.8% by weight because the component enhances colouring with $MoO_3$. A content of 3% to 5% by weight leads to particularly good results.

The selected $Al_2O_3$ content is preferably 16-26% by weight. Higher contents are disadvantageous owing to the tendency to devitrification of mullite on shaping. The minimum content is preferably 16% by weight. Preference is given to a range of 18-25% by weight.

The $SiO_2$ content should preferably be not more than 72% by weight because this component significantly increases the viscosity of the glass. Preferably, this component is limited further to values of not more than 70% and further not more than 69% by weight. For good melting of the glasses and for low shaping temperatures, higher contents of $SiO_2$ are uneconomic. The minimum $SiO_2$ content should preferably be 58% by weight, especially 60% by weight, because this is advantageous for the required use properties, for example chemical stability and thermal durability. Furthermore, scatter with short ceramization times is reduced.

In a further embodiment, the lithium aluminium silicate glass ceramic, or the article produced therefrom, preferably has a composition in % by weight based on oxide consisting essentially of:

| | |
|---|---|
| $Li_2O$ | 3-5 |
| $\Sigma\ Na_2O + K_2O$ | 0.1-<4 |
| MgO | 0-3 |
| $\Sigma\ CaO + SrO + BaO$ | 0-5 |
| ZnO | 0-4 |
| $B_2O_3$ | 0-3 |
| $Al_2O_3$ | 18-25 |
| $SiO_2$ | 60-70 |
| $TiO_2$ | 1.5-5.5 |
| $ZrO_2$ | 0-2.5 |
| $SnO_2$ | 0.1-<0.7 |
| $\Sigma\ TiO_2 + ZrO_2 + SnO_2$ | 3-6.5 |
| $P_2O_5$ | 0-5 |
| $MoO_3$ | 0.01-0.3 |
| $Fe_2O_3$ | 0.008-0.025 |
| $V_2O_5$ | 0-0.02 |

The term "consists essentially of" means that the components listed are to make up at least 96%, generally at least 98%, of the overall composition.

The addition of the alkalis $Na_2O$, $K_2O$ and of the alkaline earths CaO, SrO, BaO and of $B_2O_3$ improves fusibility and devitrification stability in the shaping of the glass. Since these components are not incorporated into the crystal phase but remain essentially in the residual glass phase of the glass ceramic, their contents have to be limited. Excessively high contents increase the thermal expansion of the glass ceramic impermissibly and impair the crystallization characteristics in the transformation of the crystallizable starting glass to the glass ceramic, here particularly at the expense of short ceramization times. Moreover, higher contents have an unfavourable effect on the time/temperature durability of the glass ceramic. The sum total of the alkalis $Na_2O+K_2O$ is to be at least 0.1% and preferably at least 0.2% by weight. An advantageous upper limit is less than 4% by weight, preferably less than 3% by weight.

The sum total of the alkaline earths CaO+SrO+BaO is to be not more than 5% by weight, preferably not more than 4% by weight. A minimum sum total of 0.2% by weight is preferred.

Said alkalis, $B_2O_3$ and alkaline earth metals, apart from in the residual glass phase, also accumulate between the crystals at the surface of the glass ceramic. The ceramization forms a vitreous surface layer of thickness about 200 to 1000 nm that is virtually free of crystals and enriched in these elements and depleted of lithium. This vitreous surface layer has a favourable effect on the chemical stability of the glass ceramic.

The optional addition of $B_2O_3$ increases devitrification resistance. Higher contents than 3% by weight are unfavourable since they increase the scatter of the glass ceramic. Preferably, a maximum of 2% by weight of $B_2O_3$ is present.

Further components that may be incorporated into the high quartz mixed crystals are MgO, ZnO and $P_2O_5$. Owing to the problem of formation of unwanted crystal phases such as zinc spinel (gahnite) in the ceramization, the ZnO content is preferably limited to values of not more than 4% by weight, more preferably not more than 3% by weight. The MgO content is preferably limited to not more than 3% by weight, more preferably up to 1.5% by weight, because it otherwise impermissibly increases the coefficient of expansion of the glass ceramic. The addition of $P_2O_5$ may be up to 5% by weight and is preferably limited to 3%. The addition of $P_2O_5$ is favourable for devitrification resistance. Higher contents have an unfavourable effect on acid resistance and short ceramization times.

$TiO_2$, $ZrO_2$ and $SnO_2$ are envisaged as nucleators in this embodiment. The total content is to be 3% to 6.5% by weight. The minimum amount is required here in order that the nucleation forms seed crystals in high density, on which the high quartz mixed crystals grow in a high number, associated with small crystallite sizes. Higher contents than a total of 6.5% by weight worsen the devitrification resistance in the course of shaping. This is particularly true of the $SnO_2$ component, which is preferably limited to values of less than 0.7% by weight, and the $ZrO_2$ component, which is preferably limited to 2.5% by weight. The $TiO_2$ component is a very effective constituent which is important for short ceramization times. The $TiO_2$ content is to be at least 1.5% by weight and at most 5.5% by weight. Higher contents than 5.5% by weight are disadvantageous for devitrification resistance and can induce unwanted Ti-containing crystal phases, for example rutile, in the glass ceramic.

For economically viable production, the crystallizable starting glass should have good fusibility and refinability and high devitrification resistance, and be ceramizable within short times. In order to lower the viscosity of the glass melt, it has been found to be advantageous to further limit the maximum content of $SiO_2$, $Al_2O_3$, $ZrO_2$, while the minimum contents of alkalis $Na_2O+K_2O$, alkaline earths CaO+SrO+BaO can be chosen at higher levels.

In order to further optimize the demands on short ceramization times and good devitrification resistance, the contents of the nucleating agents should be limited and the maximum contents of $Na_2O+K_2O$, $B_2O_3$, CaO+SrO+BaO and $P_2O_5$ should be limited.

Preferably, the lithium aluminium silicate glass ceramic, or the article produced therefrom, in this regard has a composition in % by weight based on oxide consisting essentially of:

| | |
|---|---|
| Li$_2$O | 3-5 |
| Σ Na$_2$O + K$_2$O | 0.2-<3 |
| MgO | 0-1.5 |
| Σ CaO + SrO + BaO | 0.2-4 |
| ZnO | 0-3 |
| B$_2$O$_3$ | 0-2 |
| Al$_2$O$_3$ | 18-24 |
| SiO$_2$ | 60-69 |
| TiO$_2$ | 1.5-5.5 |
| ZrO$_2$ | 0-2.5 |
| SnO$_2$ | 0.1-<0.7 |
| Σ TiO$_2$ + ZrO$_2$ + SnO$_2$ | 3.5-6.3 |
| P$_2$O$_5$ | 0-3 |
| MoO$_3$ | 0.01-0.25 |
| Fe$_2$O$_3$ | >0.03-0.015 |
| V$_2$O$_5$ | 0-<0.01 |

More preferably, ZrO$_2$ is involved in the nucleation and the ZrO$_2$ content is 0.3-<2.2% by weight. This is advantageous for the demands that are placed on the use of the glass ceramics, for example chemical stability.

The glass ceramics of the invention optionally contain additions of chemical refining agents such as As$_2$O$_3$, Sb$_2$O$_3$, CeO$_2$, and of refining additions such as manganese oxide, sulfate compounds, halide compounds (F, Cl, Br) in total contents up to 2.0% by weight.

Preferably, the glass ceramics for technical purposes are free of the arsenic oxide and antimony oxide refining agents that are critical from an environmental point of view. This means that the glass ceramics contain these components only as raw material impurities. The two components are each present as an impurity in contents of less than 1000 ppm, preferably in contents of less than 500 ppm.

Preference is also given to dispensing with the addition of halide compounds as refining aids. On melting and shaping, these form corrosive compounds such as HF, HCl and HBr, which are disadvantageous for the lifetime of the aggregates. The glasses and glass ceramics are therefore free of F, Cl, Br apart from unavoidable traces, and the individual contents thereof are less than 500 ppm.

Compounds of a multitude of elements, for example F, Cl, the alkalis Rb, Cs, or elements such as Mn, Hf are customary impurities in the batch raw materials used on the industrial scale. Other compounds, for example those of the elements W, Nb, Ta, Y, rare earths, Bi, V, Cr, Ni, may be present in small proportions, typically in the ppm range.

The water content of the crystallizable glasses for production of the glass ceramics, depending on the choice of batch raw materials and the process conditions in the melt, is preferably between 0.015 and 0.06 mol/l. This corresponds to β-OH values of 0.16 to 0.64 mm$^{-1}$. In the transformation to the glass ceramic, there is a change in the IR band which is used to determine the water content. For measurement-related reasons, this increases the β-OH value for the glass ceramic by a factor of about 1.6 without any change in the water content. This and the method for determination of the β-OH values is described in EP 1074520 A1.

The compositions of the invention permit favourable manufacturing properties for economically viable production, such as inexpensive batch raw materials, low melting and shaping temperatures, good devitrification resistance and short ceramization times.

Low melting and shaping temperatures are assured by relatively low viscosity of the glass melt at high temperatures. Characteristic parameters for this are the temperature at which the viscosity of the glass melt is 10$^2$ dPas, and the working temperature V$_A$ at which the viscosity of the glass melt is 10$^4$ dPas. The 10$^2$ temperature for the crystallizable glasses of the invention is preferably less than 1775° C., preferably less than 1760° C., and the working temperature is preferably below 1335° C., preferably below 1325° C. Since a low glass viscosity also promotes the ascent of bubbles and hence refining, a low glass viscosity is also advantageous for bubble quality.

The crystallizable glass has adequate devitrification resistance on shaping from the melt. In shaping on contact with the shaping material (e.g. precious metal in the drawing die in the rolling process), there is no formation of crystals in the glass that are critical for the strength of the glass ceramic and visually perceptible. The limiting temperature below which there is critical devitrification, i.e. the upper devitrification limit (UDL), is preferably below the working temperature V$_A$ and preferably 10° C. lower. This minimum differential defines an adequate process window for the shaping process. A particularly advantageous process window V$_A$-UDL is at least 20° C. The differential V$_A$-UDL is thus a measure of devitrification resistance.

The crystallizable glasses are transformed to the glass ceramics by the multistage temperature process described further down.

In a first embodiment, the glass ceramic is transparently coloured and contains high quartz mixed crystals as main crystal phase.

For the minimization of scatter, it is advantageous to minimize the crystallite sizes. An upper limit which is preferred owing to increasing scatter is an average crystallite size smaller than 70 nm, preferably smaller than 60 nm.

The crystal phase component of the high quartz mixed crystals in the glass ceramic is preferably at least 50% by weight and preferably at most 80% by weight. This range is advantageous in order to obtain the desired mechanical and thermal properties of the glass ceramic. A proportion of 55-75% by weight is particularly preferred.

The thermal expansion of the glass ceramic is typically set to values around 0±1·10$^{-6}$/K within the temperature range of importance for the use, i.e., for example, in the case of cooking surfaces between room temperature and about 700° C. Preferably, the average expansion in the region of the use temperatures differs at most by ±0.5·10$^{-6}$/K from the zero expansion.

In another embodiment, the transparent coloured glass ceramic contains keatite mixed crystals as the main crystal phase. The average crystallite size is preferably smaller than 150 nm in order that the scatter does not exceed the permissible haze values. The crystal phase content is preferably more than 55% by weight.

The glass ceramics may contain both types of crystal. By virtue of the different combinations of properties of the glass ceramic versions, depending on the crystal phases present, a multitude of applications is served in a technically and economically advantageous manner.

For economic reasons, it is advantageous when the same composition of the crystallizable lithium aluminium silicate glass can be used to produce both transparent coloured glass ceramics with high quartz mixed crystals as the main phase and glass ceramics with keatite mixed crystals as the main crystal phase.

The preferred geometry for the glass ceramics of the invention or the articles produced therefrom is in the form of plates. The plate preferably has a thickness of 2 mm to 20 mm because this opens up important applications. Strength is impaired in the case of lower thicknesses; higher thicknesses are less economic owing to the higher material requirement. Apart from application as safety glass, in which high strengths are important, the thickness is therefore preferably chosen as 6 mm at most.

Suitable shaping processes for the plate geometry are especially rolling and floating. The preferred shaping process from the glass melt is that via two rolls since this process has advantages with regard to devitrification owing to the more rapid cooling.

The glass ceramic plate and the articles produced therefrom with preference may be not only in a flat shape but also in three-dimensional form. For example, it is possible to use folded, angled or curved plates. The plates may be in rectangular form or in other forms and, as well as flat regions, have three-dimensionally formed regions, as for example woks, or lands or areas that have been introduced by rolling as elevations or depressions. The geometric deformations of the plates are undertaken in the hot shaping operation, for example via structured shaping rolls, or by downstream hot shaping on the starting glasses, for example by means of burners, infrared sources, or by gravity lowering. By drilling or grinding and optionally subsequent polishing, it is also possible to apply geometries such as holes or facets. In the course of ceramization, supporting ceramic shapes, for example flat underlays, are employed in order to avoid uncontrolled changes in geometric shape. Subsequent polishing of one or both sides is optionally possible if required by the application.

The process according to the invention for production of a glass ceramic of the invention is characterized in that the temperature of the glass melt reaches at least 1600° C. The minimum temperature of the glass melt of 1600° C. is required to establish a sufficient reduced state of the starting glass for the ceramization. This is required in order that sufficient concentrations of polyvalent components are present in the lower valence state, for example $As^{3+}$, $Sn^{2+}$, $Ti^{3+}$ that are capable of converting the molybdenum to the colouring reduced state in the ceramization, in which they are oxidized as redox partners. In the case of a glass melt in very reduced form, some of the molybdenum may already be reduced and colour the glasses; in general, the crystallizable starting glasses are still largely uncoloured. Preferably, the melting temperature is at least 1640° C.

The mechanism of establishment of the reduced state at high temperatures is that $O_2$ refining bubbles are formed, which ascend within and leave the glass melt, with reduction of the latter.

As shown in document WO 2010102859 A1, the redox state of the crystallizable starting glass can be determined by measuring the partial oxygen pressure of the glass as a function of temperature, $pO_2(T)$.

It has been found that a specifically established redox state of the crystallizable starting glass which is undertaken in the melt has a favourable effect on the desired transmission profile of the glass ceramic. This enhances the colouring effect of the molybdenum oxide, and smaller proportions are required for the same colouring, which is economically advantageous.

In the case of a crystallizable glass that has been excessively reduced in the melt, there are greater proportions of molybdenum in a lower valency, and these lead to uncontrolled nucleation and crystallization in the glass. These are usually high quartz mixed crystal phases. In the process of the invention, the glass is thus reduced only to such an extent that no unwanted crystallization occurs in the crystallizable glass.

The following process parameters are suitable for reducing the glass: the addition of reducing agents in pulverulent and/or liquid form to the starting batch. Suitable for this purpose are metals, carbon and/or oxidizable carbon or metal compounds, for example Al or Si powder, sugar, charcoal, carbon black, SiC, TiC, MgS, ZnS; gaseous reducing agents, for example forming gas, are also suitable; the reduction of the addition of nitrate compounds in the batch; the increase in the shard component in the batch recipe; high melting and refining temperatures and the residence time of the melt at high temperatures.

In addition, the process of the invention for producing the glass ceramics is characterized by the steps of: providing a batch recipe for industrial raw materials; containing 20% to 80% by weight of shards; melting the batch recipe and refining at temperatures that reach at least 1600° C.; establishing a reduced state in the glass in which no crystals are formed in the cooled glass; cooling the glass melt and shaping at temperatures close to the working temperature $V_A$, producing the desired shape of the article; cooling in an annealing oven to room temperature, with removal of unwanted stresses in the glass.

The batch recipe is such as to give rise to, after the melting, a glass having the composition and properties of the invention. The addition of shards at 20% to 80% by weight promotes melting, and it is possible to obtain higher tank throughputs. Refining can be effected in conventional melt tanks at maximum temperatures of the glass melt of less than 1750° C., or with an additional high-temperature refining unit at higher maximum temperatures.

In the shaping operation, preference is given to the established glass technologies, such as casting, pressing, rolling and floating. Articles having plate geometry are produced via rolling or floating and, for avoidance of stresses, cooled down to room temperature in a cooling oven. This glass strip, after assurance of quality with regard to volume and surface defects, is used to produce plates of the desired size.

The next process step is the conversion of the crystallizable glass to the glass ceramic of the invention. This ceramization is conducted on flat or three-dimensional, usually ceramic underlays in order to avoid uncontrolled changes in geometric shape. Subsequent polishing of one or both sides is optionally possible if required by the application. In the process of the invention, for ceramization, the thermally annealed crystallizable starting glass is converted to the glass ceramic at maximum temperatures of 1050° C. Preferably, the maximum temperature is less than 980° C. Low maximum crystallization temperatures are advantageous for low values for average crystal sizes and associated low scatter.

In a further configuration of the ceramization process, for economic reasons, preference is given to short ceramization times of less than 300 minutes, preferably less than 200 minutes and more preferably less than 120 minutes.

Further preferably, the crystallizable glass is ceramized in a roller kiln. In this ceramization, the thermally annealed crystallizable starting glass is heated to the temperature region of about 680° C. within 3 min to 60 min. The required high heating rates can be implemented on the industrial scale in roller kilns. This temperature region of about 680° C. corresponds roughly to the transformation temperature of the glass. Above this temperature up to about 800° C. is the range with high nucleation rates. The temperature runs through the nucleation range over a period of 10 minutes to 100 minutes. Thereafter, the temperature of the glass containing crystallization seeds is increased to a temperature of 850 to 980° C. within 5 minutes to 80 minutes, said temperature being notable for high crystal growth rates of the crystal phases. In the production of glass ceramics with high quartz mixed crystals as main crystal phase, the temperature is limited to a maximum of 970° C. This maximum temperature is maintained for up to 60 minutes. This homogenizes the microstructure of the glass ceramic and establishes the optical, physical and chemical properties. The glass ceramic obtained is cooled down to room temperature within less than 150 minutes. The cooling is preferably down to about 700° C. and is preferably conducted at a slower rate.

By virtue of the choice of the composition with $MoO_3$ for colouring, via the establishment of the redox state of the crystallizable glass and by virtue of the production parameters in the melt and ceramization, the transparent coloured glass ceramics of the invention can be used to create a wide range of brightness Y which, according to the use, at thickness 4 mm, preferably has values of 0.1% to 80% (D65 standard light, 2°).

As a lower limit, a brightness of at least 0.3%, preferably at least 0.8% and further preferably at least 1.2% is advantageous. These values lead to a dark black appearance and prevent transparency through the glass ceramic. The upper limit depends on the use and is alternatively at most 70%, at most 50% or at most 45%. At these values, the grey colour with low achromaticity is clearly perceptible.

Preferably, the transparent coloured lithium aluminium silicate glass ceramic in plate geometry is used as stove sightglass, cooking, grilling or frying surface, in fire protection glazing, baking oven sightglass (especially for pyrolytic cookers), cover in the lighting sector, as safety glass, optionally in a laminate composite, as carrier plate or oven lining in thermal processes.

In the case of stove sightglasses, good colour-neutral transparency to the combustion space and the flames is desired. Brightness for construction thicknesses of 2.5 to 6 mm is preferably at values of 1-80%, especially at values of 5-80%. The brightness value desired for the use is established for the particular construction thickness. Compared to transparent glass ceramic panes with higher brightnesses, the combustion space with flames extinguished is less transparent and the residues of the combustion material are hidden. For the reduction in transparency, the upper brightness limit is preferably 50%, more preferably 35% and further preferably 25%. For the visibility of the flame, a lower limit of preferably 8%, more preferably 10% and further preferably 12% is advantageous. A further-preferred brightness range is 8-25%.

Other sightglasses, for example for fire protection glazing, baking ovens, lighting or safety glass, in terms of brightness for construction thicknesses of 2.5 to 6 mm, are preferably in the range of 0.1-80%, and profit from the low colour or chromaticity and hence grey transparency. For use of the glass ceramic plate as component in the fire protection glazing, the low colour is advantageous for integration into glass fronts in which panes of standard soda-lime glass are also installed.

In the case of dark-coloured cooking surfaces, the brightness of the glass ceramic plate for construction thicknesses between 2.5 and 6 mm is preferably 1.2-5% in order to achieve a black appearance and in order to prevent unappealing transparency to technical components below the cooking surface. The brightness value desired for the use is established for the particular construction thickness. The range of values assures displaying capacity, usually with light-emitting diodes, and prevents the dazzle effect by radiative heating elements. In these cooking surfaces, with exploitation of the low chromaticity of the invention, preference is given to dispensing with the use of technical measures, such as colour filters or layers, for colour correction of the light transmitted.

In the case of cooking surfaces, in an alternative design with higher brightness values beginning from about 2% up to a maximum of 80%, for construction thicknesses between 2.5 and 6 mm, in general, a mask is additionally applied, usually executed as an opaque upper and/or lower side coating, in order to prevent the technical components below the cooking surface from being seen. The lower limit depends on the construction of the cooktop and the lighting. Regions excluded from the coating are provided for the mounting of sensor areas, coloured and white display devices, cooking zone markings. and displays and screens.

It is possible to combine coatings on the top and bottom side of the transparent coloured glass ceramic plate, and also to include semi-transparent layers. It is likewise possible to apply markings, for example for cooking zones. The known different types of coatings, for example with organic or inorganic decorative colours, lustre colours, silicone- and sol-gel-based colours, sputtered layers, metallic, oxynitride and oxycarbide layers and so forth are usable and combinable in accordance with the prior art. Layers may also be applied one on top of another. In the case of cooking surfaces having a coloured underside coating, the colour of the underside coating is distorted to a lesser degree, if at all, owing to the inventive low colour and low scatter of the glass ceramic.

The prior art discloses, for both designs of cooking surfaces, various usable options as to the nature and technical execution of coatings, display devices and sensors and the integration thereof into the cooktop, together with further components for securing or light guiding, for example in US 2016281961 A, US 20130098903 A1 and DE 102016101036 A1.

Preferably, one or more displays are disposed beneath the glass ceramic cooking surfaces of the invention with reduced colour. The display devices consist of light-emitting electronic components, for example of white or coloured light-emitting diodes, RGB-LEDs, OLEDs, LCDs, fluorescent displays, projectors, fluorescent tubes, displays and screens. All forms of displays are possible, including dot displays and two-dimensional displays, including 7-segment displays. The emission spectra of the radiative displays may be monochromatic or be polychromatic and have multiple maxima and broad ranges, such that the displays have a coloured (for example violet, blue, purple, red, green, yellow, orange) or white appearance. Owing to the low chromaticity of the glass ceramic, black-white and colour displays or screens can be viewed without disruptive colour distortion. Preference is given to dispensing with the mounting of colour filters or colour layers applied to the underside. In order to improve the visibility of the displays, these may be adhesive-bonded with refractive index-adapted polymers, or masks may be mounted. Anti-reflection, scattering, diffuser or anti-glare layers may be applied to the glass ceramic plate.

In addition, control, sensor and controlling/driving elements, for example those of the capacitative or inductive type, may be mounted on, printed onto, bonded to or pressed onto the glass ceramic plate. The high IR transmission over a broad wavelength range is advantageous for sensors for temperature control. As well as the displaying of operating states, it thus becomes possible for the user to interact with the cooking surface. It is possible, for example, to read recipes, view images or communicate with the intranet. Control can be effected via touch-sensitive screens. The underside of the cooking surface may have the customary pimples or be smooth (via polishing or floating). The improved displaying capacity is manifested particularly in the case of cooking surfaces with a smooth underside since the colour displays are perceptible in an undistorted and brighter manner. The cooking surface may contain regions having lower thickness for the displays. Since transmission is exponentially dependent on layer thickness, the brightness of the display, for example in the case of a screen, is significantly increased. However, the other regions of the cooking surface should be thicker in order that they have the brightness of the invention.

Owing to its improved displaying capacity, the cooking surface may take the form of part of a continuous glass ceramic plate and hence may be present as a larger work surface or kitchen table with dimensions above 0.5 m² and improved interactive functions.

The cooking surfaces are heated as usual with gas burners, induction loops or radiative or halogen elements.

The glass ceramic of the invention is suitable for production of regions with locally altered transmission by electromagnetic radiation as described in WO 2014170275 A2. Such regions with elevated light transmission, for example, are advantageous for display windows.

In the case of stove or oven sightglasses, coatings may also be desired, for example for opaque coverage at the edge of the glasses. The arrangement of the coatings on the top or bottom side of the glass ceramic plate is undertaken according to the aesthetic and specific demands on chemical and physical properties.

These uses are alternatively served by lithium aluminium silicate glass ceramics with keatite or high quartz mixed crystals as main crystal phase.

The glass ceramic with keatite mixed crystals as main crystal phase preferably finds use as cover plate, housing component of electronic devices (back cover) or incorporated into microwave ovens, since this crystal phase couples onto the microwave radiation to a lesser degree and is heated to a lesser degree as a result.

Further preferred uses for both glass ceramic designs, whether with high quartz mixed crystals or with keatite mixed crystals as main crystal phase, are those as cookware, reflectors in projectors. In the ceramics, solar or pharma industry or medical technology, they are especially suitable for production processes under high-purity conditions, for example as setter plates, as lining of ovens or vacuum chambers in which chemical or physical coating processes are conducted, or as chemically resistant laboratory fitout material. Moreover, they find use as glass ceramic article for high-temperature or extreme low-temperature applications, as oven window for combustion ovens, as heat shield for shielding against hot environments, as cover for reflectors, floodlights, projectors, photocopiers, for applications with thermomechanical stress, for example in night vision devices, or as cover for heating elements, especially as cooking, grilling or frying surface, as white good, as element cover, as wafer substrate, as article with UV protection, as the side panel or as material for housing components, for example of electronic devices and/or cover glasses for IT, such as mobile phones, laptops, scanner glasses, cover or housing of LIDAR sensors, or as component for ballistic protective glazing.

Preferred uses around room temperature are those as a precision component, for example as spacers or as wafer stages, as mirror backing material for reflective optical components such as in astronomy, and in LCD or EUV lithography, or as laser gyroscope.

The transparent coloured glass ceramics of the present invention meet the demands on transparency, which means low scatter, have low chromaticity and satisfy all further demands that are made on the use thereof, for example low thermal expansion, chemical stability, mechanical strength, thermal durability and high temperature/time durability with regard to changes in their properties (for example thermal expansion, transmission, buildup of stresses).

DETAILED DESCRIPTION

The present invention is illustrated further by the examples which follow.

Figure 1A:
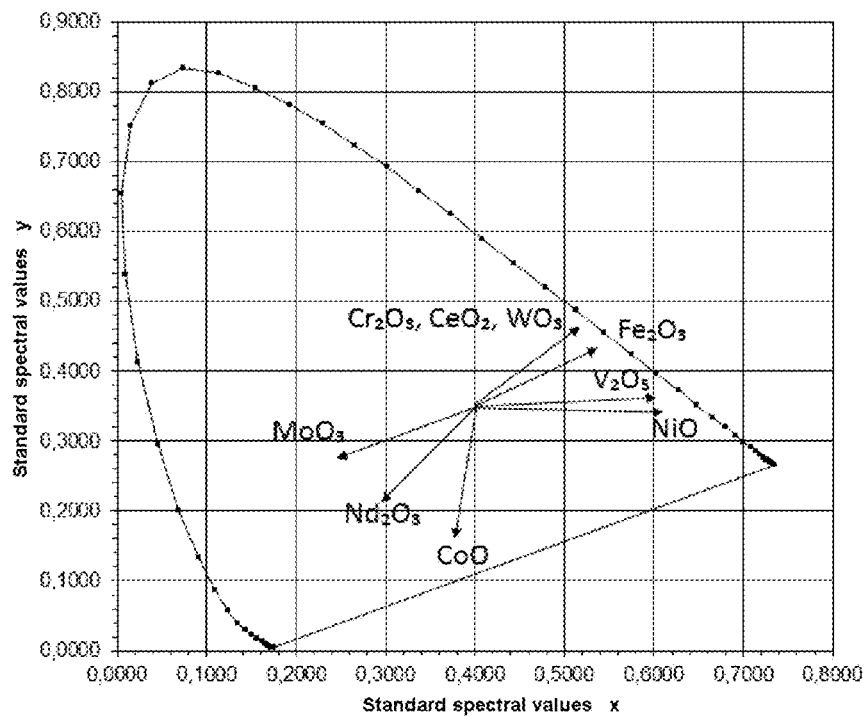
FIGS. 1a and 1b show chromaticity diagrams of the CIExyY colour space with 2° standard observer (CIExyY-2°).
Figure 1B:
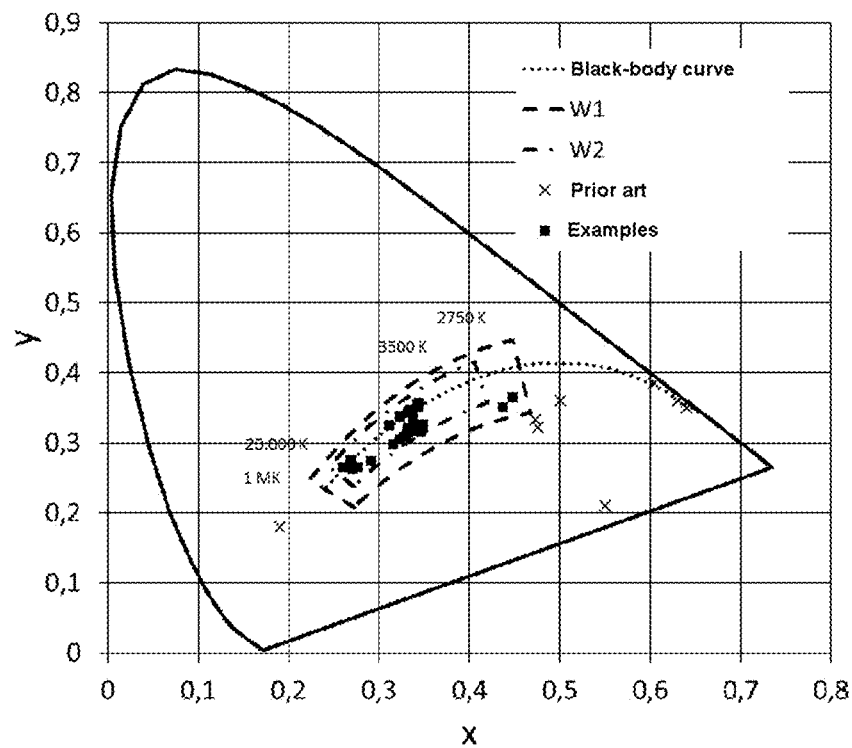
Figure 2:
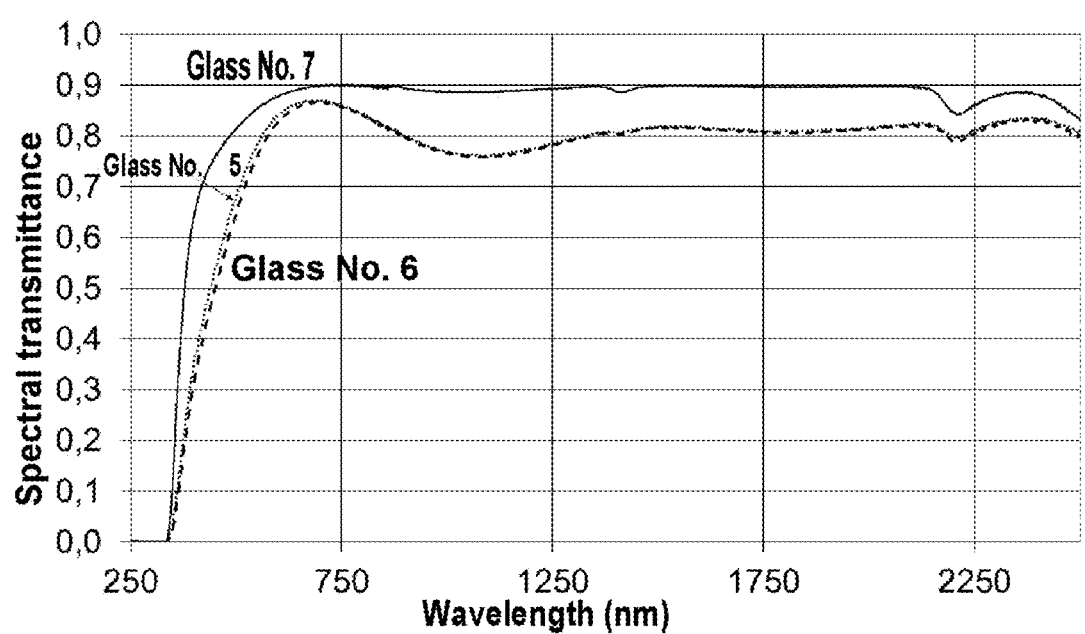
FIG. 2 shows the transmission curves for the glass of Examples 5, 6, and 7.
Figure 3A:
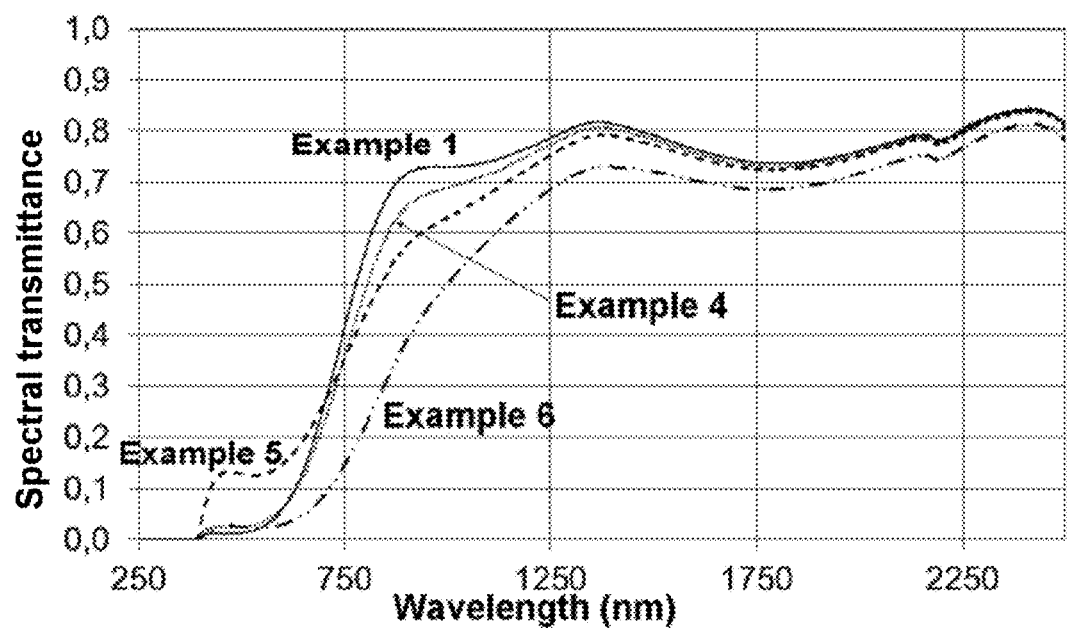
FIGS. 3a and 3b show the transmission curves for the glass of Examples 1, 4, 5, and 6 at different wavelengths.
Figure 3B:
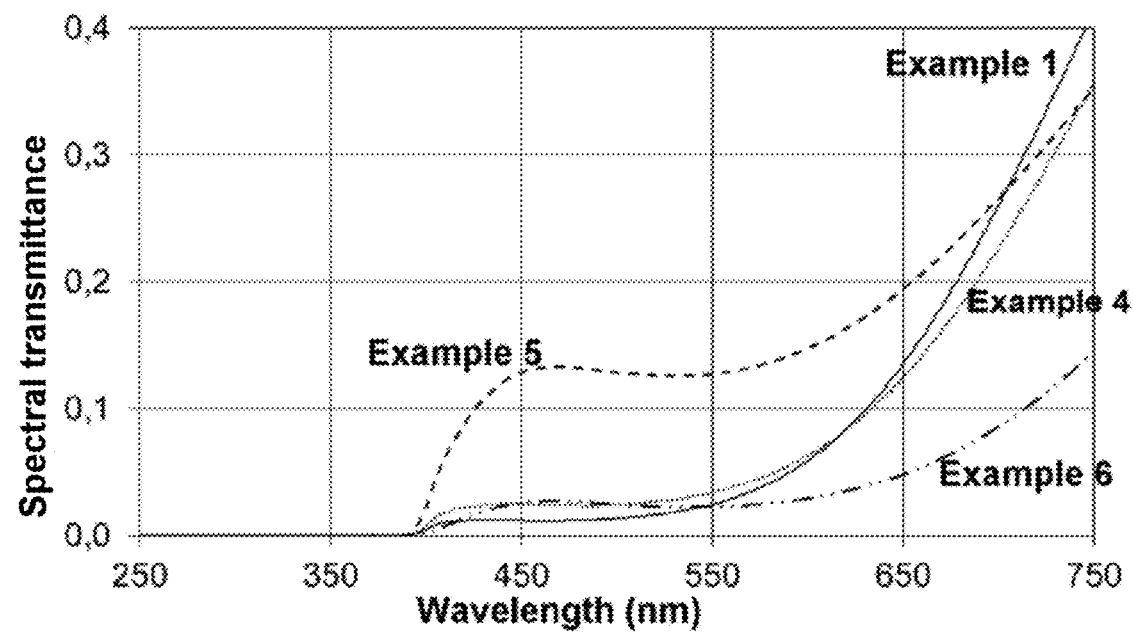
Figure 4:
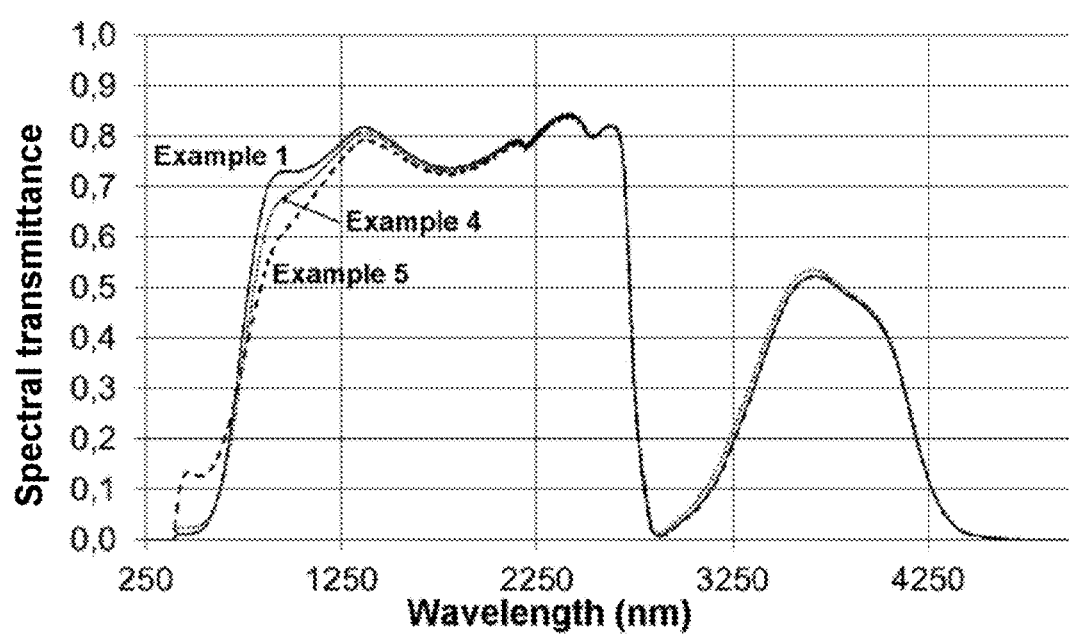
FIG. 4 shows the transmission curves for the glass of Examples 1, 4, and 5.

FIGS. 1a and 1b show chromaticity diagrams of the CIExyY colour space with 2° standard observer (CIExyY-2°). FIG. 1a shows, in qualitative form, the direction of the colour shift in the CIE standard colour system on doping with various colouring compounds. Depending on the composition of the glass ceramic, the brightness Y and the starting colour locus, there may be moderate changes in the directions of the colour arrows. FIG. 1b depicts the blackbody curve as a dotted line, the two white regions W1 and W2 as a dashed line, the colour coordinates of the inventive examples as black squares, and examples from the prior art as black crosses. The examples shown from the prior art correspond to the glass ceramic types known from WO 2012076414 A1 and commercially available glass ceramics from SCHOTT AG and Eurokera. The examples from the prior art are all outside the white region W1. As known from WO 2012076414 A1, the white region W1 can be covered by these glass ceramics only through the use of additional, complex compensation filters. However, the inventive examples cover this region even without such a filter. All the colour loci shown relate to a material thickness of 4 mm.

FIGS. 2, 3a-3b, 4, 5a-5b, 6, 7a-7b, 8a-8b, and 9a-9b show the transmission curves for the crystallizable glasses detailed and the glass ceramic examples with thickness 4 mm in various wavelength ranges.

The crystallizable glasses 1 to 36 were melted from technical batch raw materials that are customary in the glass industry at temperatures of 1620° C., 4 hours. With this choice, the demands for economically viable raw materials and a low impurity content of unwanted impurities can be reconciled. After the melting of the batch in crucibles made of sintered silica glass, the melts were poured into Pt/Rh crucibles with an inner silica glass crucible and homogenized by stirring at temperatures of 1600° C., 60 minutes. After this homogenization, the glasses were refined at 1640° C. for 2 hours. Subsequently, pieces of size about 120×140×30 mm$^3$ were cast and cooled down to room temperature in a cooling oven beginning from 640° C. in order to dissipate stresses. The castings were divided into the sizes required for the studies and for the ceramization.

The impurities through typical trace elements in the technical raw materials used are 200 ppm $B_2O_3$, 30 ppm Cl, 1 ppm CoO, 3 ppm $Cr_2O_3$, 200 ppm $Cs_2O$, 3 ppm CuO, 200 ppm F, 400 ppm $HfO_2$, 3 ppm NiO, 500 ppm $Rb_2O$, 5 ppm $V_2O_5$.

Table 1 shows a base composition for crystallizable glasses and the properties thereof. The base composition base glass 1 corresponds to the comparative glass 1 according to the prior art outside the invention. Table 1 also lists the following properties in the vitreous state: transformation temperature Tg [° C.], working temperature $V_A$ [° C.], $10^2$ temperature [° C.] and upper devitrification limit UDL [° C.]. For measurement of the UDL, the glasses are fused in Pt/Rh10 crucibles. Subsequently, the crucibles are kept at different temperatures in the region of the working temperature for 5 hours. The uppermost temperature at which the first crystals occur at the contact surface of the glass melt with the crucible wall determines the UDL. The glass properties of the base glass are altered to a minor degree by doping with small amounts of colouring compounds.

Different contents of colouring compounds are added to the batch raw materials of this base composition, and new glasses are fused. By addition of the $MoO_3$ component, compositions of the invention are obtained. The glasses thus obtained in Table 2 have the base composition of glass 1 and differ merely in the colouring compounds specified and optionally reducing additives. They are crystallized by the ceramization programs listed in Table 2. The transmission properties and scatter of the glass ceramics obtained are listed. The main crystal phase measured by x-ray diffraction is also listed. For some examples, thermal expansion between 20° C. and 300 or 700° C. was also measured.

Examples 1 and 2 are comparative examples from the prior art (WO 2010102859 A1), with a $V_2O_5$ content of 0.023% by weight, which were ceramized from comparative glass 1 with different programs. Inventive examples 3 and 4 contain less than 0.015% by weight of $V_2O_5$. By comparison with $V_2O_5$-free examples, these shift D65 standard illuminant light more strongly in the red direction, namely to x coordinates >0.4. By contrast with Comparative Examples 1 and 2, however, the value is still in the region of x<0.5. Light transmitted through the glass ceramics of Examples 3 and 4 at a thickness of 4 mm is within the white region W1, but is not within the white region W2 owing to the $V_2O_5$ content. Examples 3 and 4 are the only inventive examples that are not also within the particularly preferred white region W2.

The further Comparative Examples 17 and 27 contain more than 0.01% by weight of $Cr_2O_3$. D65 standard illuminant light transmitted through such glass ceramics is no longer within the white region W1.

In the case of crystallizable starting glasses of the same oxide composition, the effect of different ceramizations and the addition of reducing compounds and of shards to the batch on transmission should be noted. In the case of addition of sugar, this is oxidized without measurable residues, but affects the redox state of the glass. In the case of glass 29, 0.07% by weight of S is added to the batch as ZnS. In the glass, the analysed concentration of S is <10 ppm below the detection limit. The addition both of sugar and of S leads to a significant enhancement of colouring by Mo.

Figure 5A:
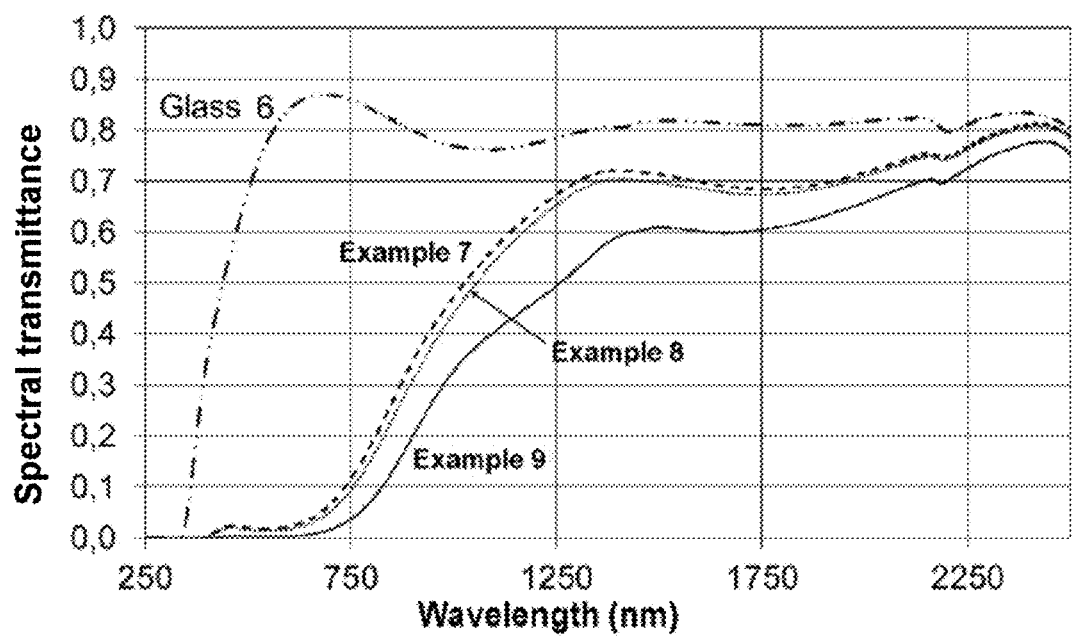
FIGS. 5a and 5b show the transmission curves for the glass of Examples 6, 7, 8, and 9 at different wavelengths.
Figure 5B:
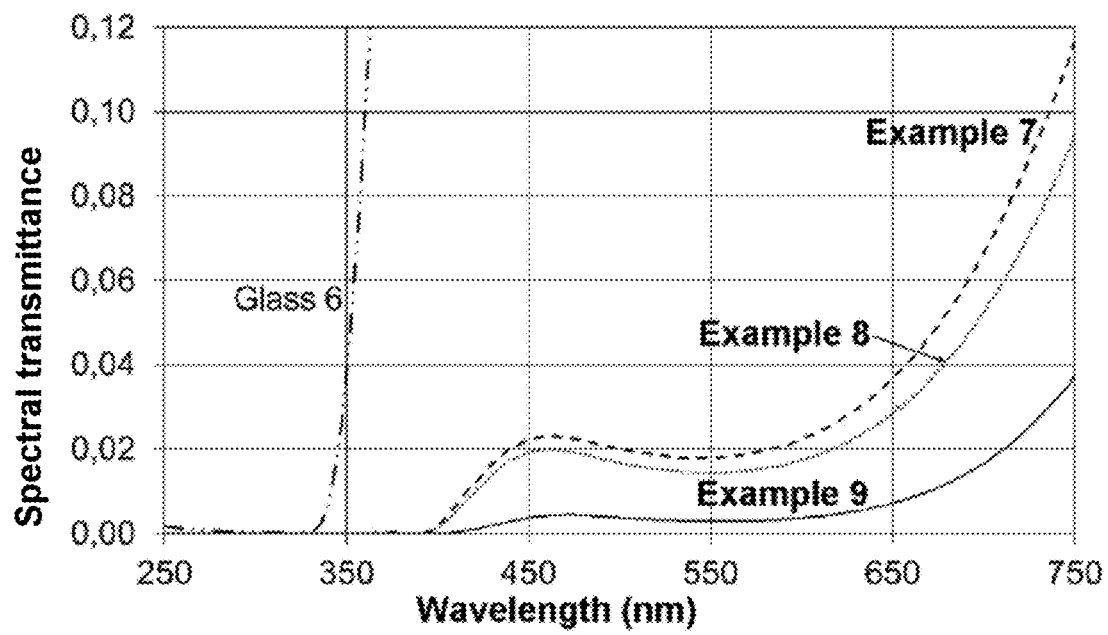
Figure 6:
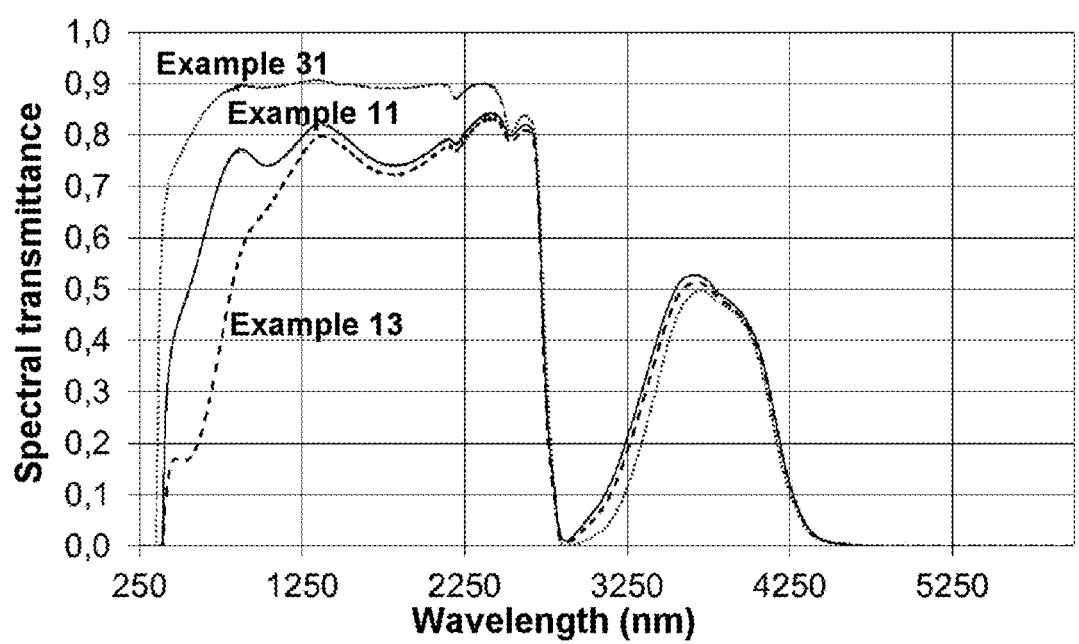
FIG. 6 shows the transmission curves for the glass of Examples 11, 13, and 31.
Figure 7A:
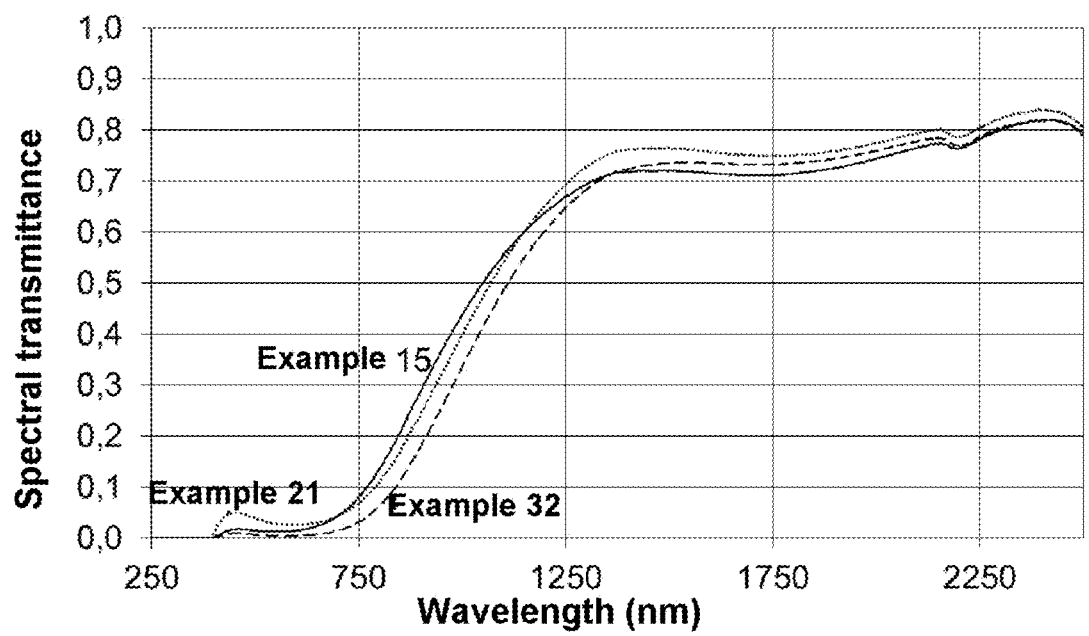
FIGS. 7a and 7b show the transmission curves for the glass of Examples 15, 21, and 32 at different wavelengths.
Figure 7B:
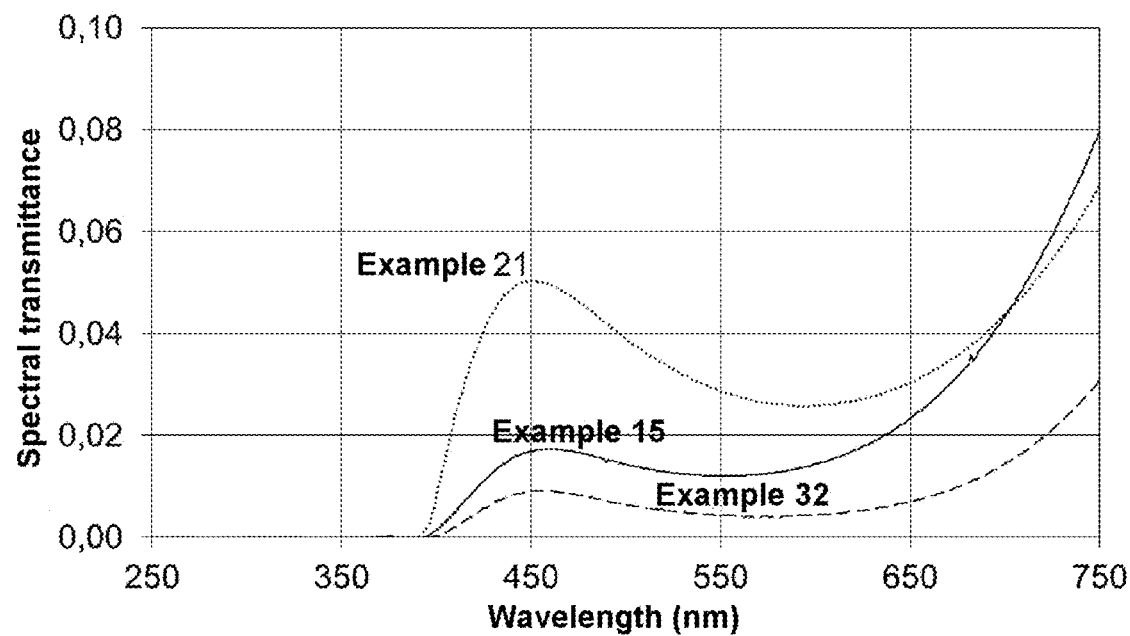
Figure 8A:
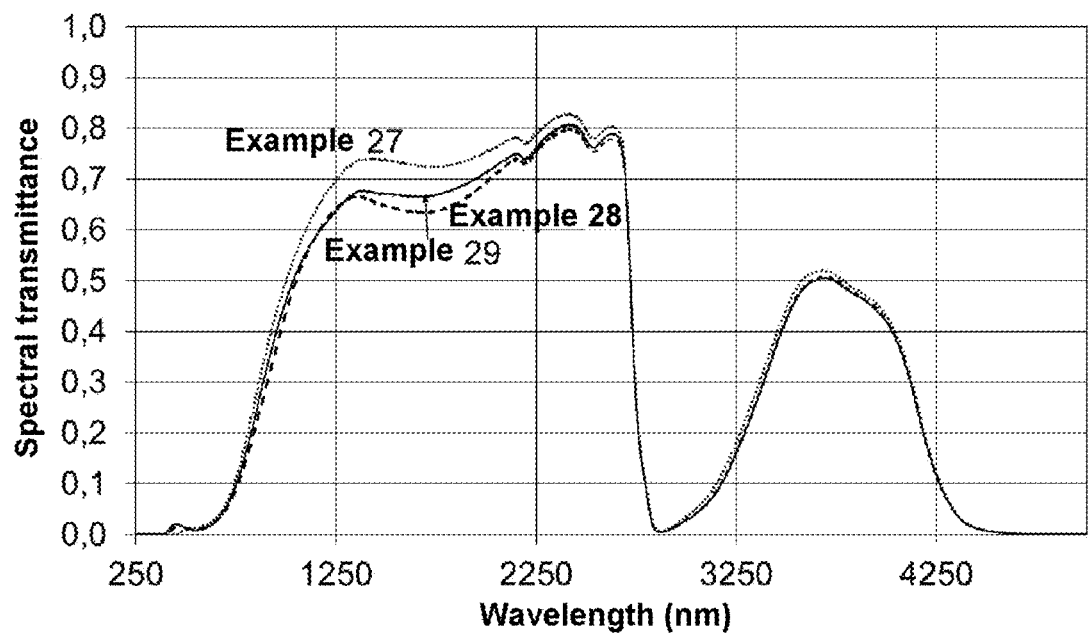
FIGS. 8a and 8b show the transmission curves for the glass of Examples 27, 28, and 29 at different wavelengths.
Figure 8B:
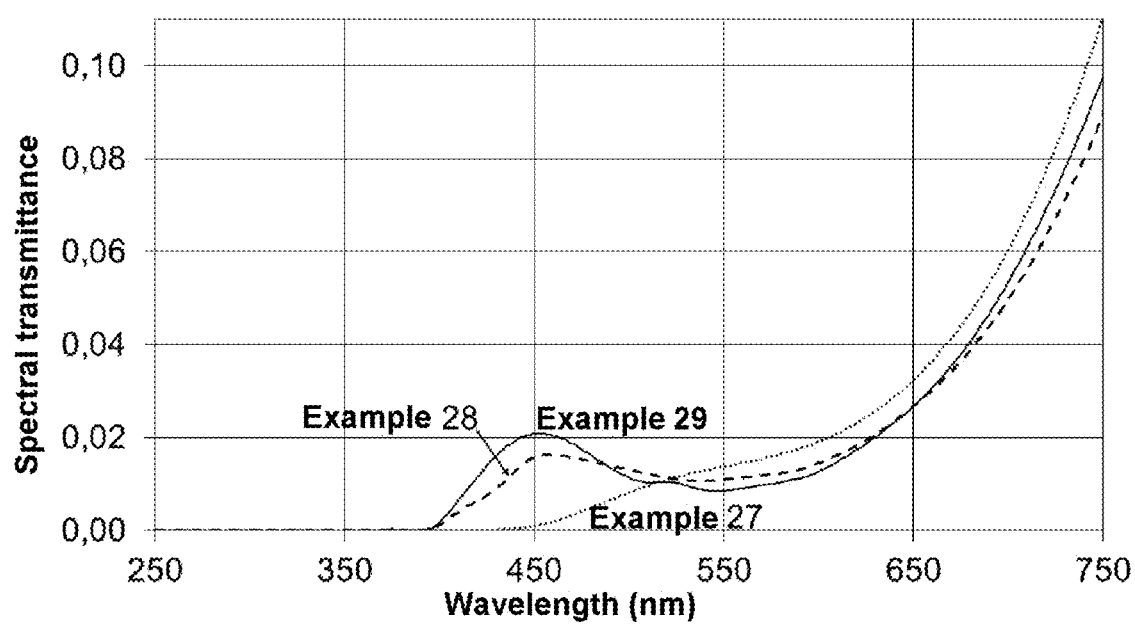
Figure 9A:
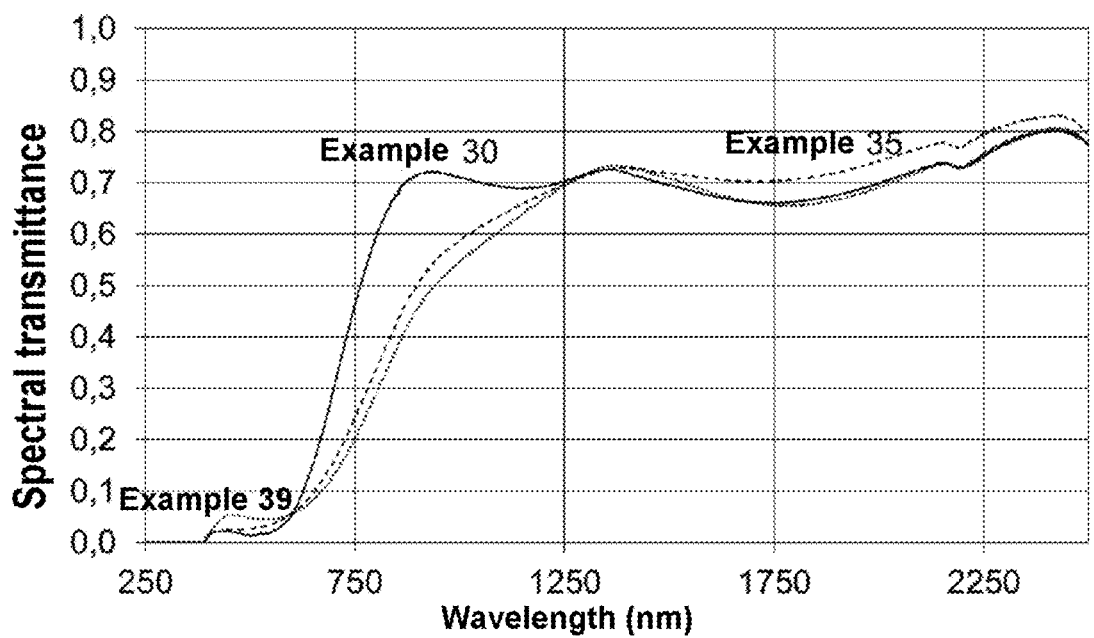
FIGS. 9a and 9b show the transmission curves for the glass of Examples 30, 35, and 39 at different wavelengths.
Figure 9B:
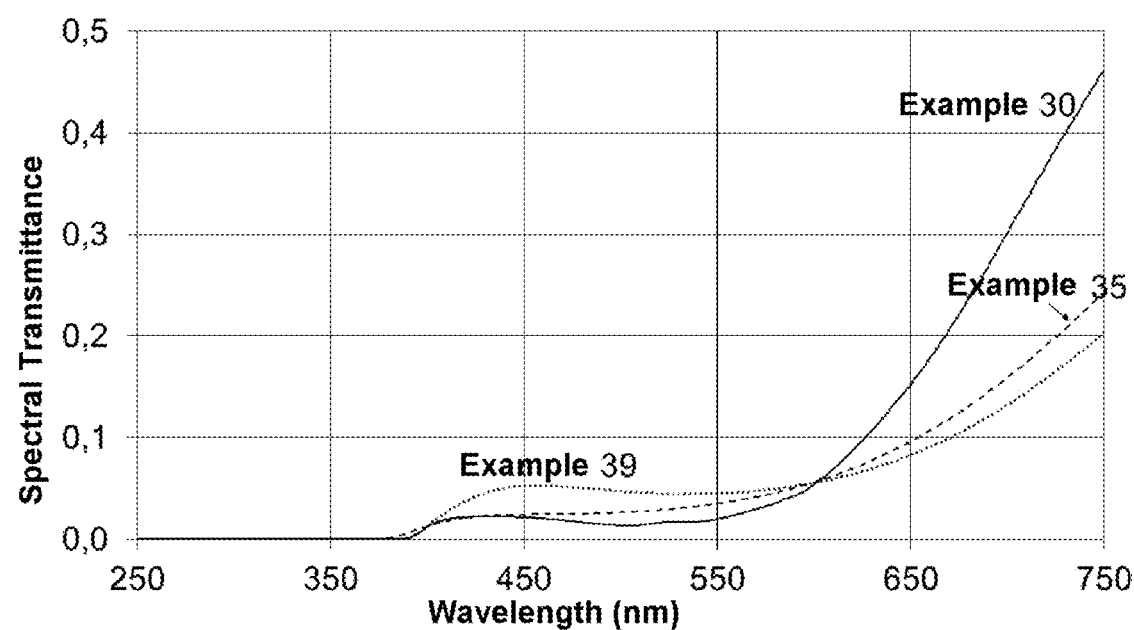

FIGS. 5a-5b show how different transmission spectra are obtained from the crystallizable glass 6 by different ceramizations. It can also be inferred from FIGS. 5a-5b, and from FIG. 2, that colouring with Mo sets in only with the ceramization.

In the case of the glass ceramics of Table 2 with high quartz mixed crystals as main crystal phase, thermal expansion is altered to a minor degree by the doping with colouring compounds. For selected examples, thermal expansion was measured between 20 and 300° C. and between 20 and 700° C., and in each case is within a region of less than ±0.07·10$^{-6}$/K around the averages −0.27 and 0.13·10$^{-6}$/K. The values for the non-measured examples are also assumed to be within this region.

Table 3 shows the compositions of further crystallizable glasses and selected properties. Comparative glass 22, in terms of its composition, corresponds to the KeraVision® glass ceramic from EuroKera. The glass doped with Fe, V, Mn and Co, after transformation to the comparative glass ceramic 30 (Table 4), does not attain the low colour of the invention; more particularly, light transmitted through such a glass ceramic is no longer within the white region W1. Examples 32 and 40 have a higher $TiO_2$ content and show an enhancement of colouring with molybdenum oxide. Examples 33 and 34 produced from the crystallizable glasses 25 and 26 have been refined not with $SnO_2$ but with $As_2O_3$. The described disadvantages of the weaker redox partner As are manifested. Compared to Sn, colouring with $MoO_3$ is much lower, and even the addition of reducing compounds cannot significantly reduce the brightness, unlike in the case of $SnO_2$-refined glass ceramics.

The ceramization program 1 involves heating up to a temperature of 600° C. in the ceramization oven within 20 min. The oven is heated up further. The total time from room temperature to 680° C. is 23 min. The temperature range from 680° C. to 800° C. is important for nucleation. Therefore, the oven is heated up further. The total time between 680° C. and 800° C. is 19 min. Above about 800° C., the desired high quartz mixed crystal phase crystallizes. The total time from 800° C. until attainment of the maximum temperature of 918° C. is 24 min (heating rate 5° C./minute). At the maximum temperature of 918° C., hold time 10 min, the composition of crystals and residual glass is established and the microstructure is homogenized. This establishes the chemical and physical properties of the glass ceramic. Cooling is effected in a controlled manner to 800° C. (cooling rate 6° C./min), then the sample is quenched to room temperature by opening the oven door; in other words, in summary:

Ceramization program 1 (ceramization time 96 min): heating within 23 minutes from room temperature to 680° C.; temperature increase from 680 to 800° C. within 19 min, involving heating at 10° C./min to 730° C., further heating at 5° C./min to 800° C.; temperature increase from 800° C. to 918° C. within 24 min and hold time of 10 min at maximum temperature; cooling down to 800° C. within 20 minutes, then rapid cooling to room temperature.

In ceramization program 2, the ceramization time has been shortened.

Ceramization program 2 (ceramization time 68 min): rapid heating from room temperature to 740° C. within 26 min; temperature increase from 740 to 825° C. within 18 min (heating rate 4.7° C./min); temperature increase from 825° C. to 930° C. within 4 min (heating rate 26° C./min), hold time of 4 min at maximum temperature; cooling down to 800° C. within 16 minutes, then rapid cooling to room temperature.

An additional ceramization program 3 effected transformation to glass ceramics with keatite mixed crystals as main crystal phase. In this program, the procedure of program 1 was followed up to 800° C. Then, in a departure from program 1, heating was effected at a heating rate of 5° C./min to a maximum temperature of 960° C. with hold time 10 min. Cooling was effected from the maximum temperature at 6° C./min to 800° C., and then cooling was effected rapidly to room temperature.

The glass ceramics of Examples 9 and 12 that were produced by the ceramization program 3 contain, measured by x-ray diffraction, 79% keatite mixed crystals as main crystal phase. At the same time, crystallite sizes are enlarged at about 120 nm, and so disruptive scatter occurs when display elements are used below the glass ceramic. The other glass ceramics produced with the ceramization programs 1 and 2 contain high quartz mixed crystals at generally more than 90% of the total crystal phase content. Further crystal phases are the nucleator phases $ZrTiO_4$. At the same time, crystallite sizes are so small at less than 70 nm that no disruptive scatter occurs when display elements are used below the glass ceramic.

The thermal expansion of the glass ceramics with high quartz mixed crystal as main crystal phase is $0\pm0.5\cdot10^{-6}$/K in the range of 20-700° C., i.e. meets the demands for thermally stable glass ceramics. For example, thermal expansion for the base composition of Example 1 is $0.13\cdot10^{-6}$/K, and for Example 39 is $0.29\cdot10^{-6}$/K, in the range of 20-700° C.

The transmission measurements were conducted on polished plates with the Perkin-Elmer Lambda 900 instrument. Transmission was determined on samples having a thickness of 3.5 to 4.1 mm and converted to a thickness of 4 mm. Spectral transmittances are reported for selected wavelengths. The measured spectral values in the range between 380 nm and 780 nm, which represents visible light, are used to calculate the brightness L* and the colour coordinates a*, b* in the CIELAB colour system, and the brightness Y and colour coordinates x, y to DIN 5033 in the CIE colour system for the chosen standard illuminant and observer angle 2°. Chromaticity c* and the colour separation d from the colour coordinates of D65 standard illuminant light, x=0.3127 and y=0.3290, are reported. This was calculated as follows:

$$d=\sqrt{(x-0.3127)^2+(y-0.3290)^2}.$$

The profile of the transmission curve in the range from 470 to 630 nm was used to calculate the flatness of the curve (quotient of highest to lowest transmission in this range). The wavelengths for the maximum and minimum transmission are likewise reported. The values are reported for 4 mm-thick polished samples.

The scatter of the glass ceramics is determined by measuring haze. This involves measuring samples of thickness 3.5-4.1 mm that have been polished on both sides with a commercial "haze-gard plus" measuring instrument from BYK Gardner (standard ASTM D1003-13) with standard light C. Scatter is characterized by the haze value in the tables.

In addition, a visual assessment is conducted on the samples with a commercial white LED of the 7-segment display type (manufacturer: opto devices, model: OS39D3BWWA). The polished glass ceramic samples were placed onto the white LED at a distance of 1 mm and viewed from above at a distance of 31 cm over the entire angle range, i.e. perpendicularly to obliquely to the glass ceramic surface. Depending on the brightness of the glass ceramic sample, the luminance of the white LED at this distance at right angles to the glass ceramic plate was regulated to 60 $cd/m^2$, or, in the case of very dark glass ceramic samples Y<0.5%, operated at maximum power. In order to rule out the influence of outside light, the assessment is undertaken in a dark chamber with low ambient lighting of about 4 lux. For a cooktop, these conditions mean a very critical installation and lighting situation.

The visual assessments in the tables mean: 1=no scatter perceptible, 2=low but tolerable scatter, 3=visible scatter, requires additional work for the configuration of the cooktop, 4=distinctly visible scatter, intolerable. Ratings over and above stage 4 are impermissible, and those over and above stage 3 should preferably be avoided. Apart from the Examples 9 and 12 with keatite mixed crystal (KMC) as main crystal phase, the examples have no visible scatter.

TABLE 1

Composition and properties of the crystallizable base glass 1 with base composition.

| Composition | % by wt. | Glass No. 1 |
|---|---|---|
| $Li_2O$ | | 3.80 |
| $Na_2O$ | | 0.60 |
| $K_2O$ | | 0.25 |
| MgO | | 0.29 |
| CaO | | 0.40 |
| SrO | | 0.02 |
| BaO | | 2.23 |
| ZnO | | 1.53 |
| $Al_2O_3$ | | 20.9 |
| $SiO_2$ | | 65.0 |
| $TiO_2$ | | 3.10 |
| $ZrO_2$ | | 1.38 |
| $P_2O_5$ | | 0.09 |
| $SnO_2$ | | 0.25 |
| $As_2O_3$ | | |
| $Fe_2O_3$ | | 0.090 |
| $V_2O_5$ | | 0.023 |
| $MoO_3$ | | |
| $MnO_2$ | | 0.025 |
| $Cr_2O_3$ | | |
| $CeO_2$ | | |
| $WO_3$ | | |
| $H_2O$ content (β-OH) | $mm^{-1}$ | 0.39 |
| Properties in glass form | | |
| Transformation temperature Tg | ° C. | 662 |
| $10^2$ temperature | ° C. | 1742 |
| Working temperature $V_A$ | ° C. | 1306 |
| UDL temperature | ° C. | 1260 |

TABLE 2

Dopants and properties of the inventive ceramics and comparative glass ceramics 1 and 2

| | | Example No. | | | | | |
|---|---|---|---|---|---|---|---|
| | | 1 | 2 | 3 | 4 | 5 | 6 |
| Glass No. | | 1 | 1 | 2 | 3 | 4 | 5 |
| Base glass | | 1 | 1 | 1 | 1 | 1 | 1 |
| Dopants (% by wt.) | | | | | | | |
| $Fe_2O_3$ | | 0.090 | 0.090 | 0.120 | 0.088 | 0.088 | 0.088 |
| $V_2O_5$ | | 0.023 | 0.023 | 0.010 | 0.013 | | |
| $MoO_3$ | | | | 0.057 | 0.046 | 0.078 | 0.170 |
| $MnO_2$ | | 0.025 | 0.025 | 0.025 | 0.025 | 0.025 | 0.025 |
| $Cr_2O_3$ | | | | | | | |
| $CeO_2$ | | | | | | | |
| $WO_3$ | | | | | | | |
| Addition to batch | | | | | | | |
| Ceramization program | # | 1 | 2 | 1 | 1 | 1 | 1 |
| Transmission, thickness 4 mm, D65 standard light, 2° | | | | | | | |
| 470 nm | % | 1.2 | 0.7 | 2.9 | 2.4 | 13.3 | 2.7 |
| 630 nm | % | 9.9 | 6.6 | 12.6 | 9.5 | 17.2 | 3.9 |
| 950 nm | % | 73.0 | 71.9 | 66.5 | 67.7 | 60.8 | 45.0 |
| 1600 nm | % | 76.4 | 76.3 | 70.9 | 75.7 | 74.8 | 70.3 |
| 3700 nm | % | 52.0 | 51.1 | 50.0 | 53.2 | 52.2 | 50.4 |
| Colour coordinates (CIE) in transmission | | | | | | | |
| x | | 0.502 | 0.517 | 0.447 | 0.436 | 0.337 | 0.348 |
| y | | 0.367 | 0.358 | 0.365 | 0.351 | 0.334 | 0.327 |
| Brightness Y | % | 3.6 | 2.2 | 5.8 | 4.4 | 13.6 | 2.6 |
| Colour distance d | | 0.193 | 0.207 | 0.139 | 0.125 | 0.025 | 0.035 |
| Colour coordinates (CIELAB) in transmission | | | | | | | |
| L* | | 22.5 | 16.6 | 29.0 | 24.9 | 43.6 | 18.4 |
| a* | | 21.4 | 21.0 | 17.1 | 16.4 | 5.1 | 5.7 |
| b* | | 20.6 | 17.5 | 17.2 | 12.5 | 3.5 | 1.7 |
| c* | | 29.7 | 27.4 | 24.3 | 20.6 | 6.1 | 6.0 |
| Flatness of transmission (wavelength at max./min.) | nm | 8.4 630/470 | 10.0 630/470 | 4.4 630/470 | 4.0 630/470 | 1.4 630/529 | 1.7 630/538 |
| Visual assessment | | 1 | 1 | 1 | 1 | 1 | 1 |
| Haze | % | 0.8 | 0.5 | 1.5 | 1.5 | 1.5 | 1.1 |
| Thermal expansion | | | | | | | |
| $\alpha_{20/300}$ | $10^{-6}/K$ | −0.26 | −0.29 | | | | |
| $\alpha_{20/700}$ | $10^{-6}/K$ | 0.13 | 0.17 | | | | |
| X-ray diffraction | | | | | | | |
| Main crystal phase | | HQMC | HQMC | HQMC | HQMC | HQMC | HQMC |

Dopants and properties of the inventive glass ceramics

| | | Example No. | |
|---|---|---|---|
| | | 7 | 8 |
| Glass No. | | 6 | 6 |
| Base glass | | 1 | 1 |
| Dopants (% by wt.) | | | |
| $Fe_2O_3$ | | 0.088 | 0.088 |
| $V_2O_5$ | | | |
| $MoO_3$ | | 0.170 | 0.170 |
| $MnO_2$ | | 0.025 | 0.025 |
| $Cr_2O_3$ | | | |
| $CeO_2$ | | | |
| $WO_3$ | | | |
| Addition to batch | | 50% shards | 50% shards |
| Ceramization program | | 1 | 2 |
| Properties in ceramized form | | | |
| Transmission, thickness 4 mm, D65 standard light, 2° | | | |
| 470 nm | | 2.3 | 2.0 |
| 630 nm | | 3.9 | 2.3 |
| 950 nm | | 41.5 | 35.3 |

TABLE 2-continued

|  |  |  |
|---|---|---|
| 1600 nm | 69.8 | 68.5 |
| 3700 nm | 51.8 | 52.0 |

Colour coordinates (CIE) in transmission

|  |  |  |
|---|---|---|
| X | 0.338 | 0.329 |
| Y | 0.318 | 0.311 |
| Brightness Y | 2.0 | 1.6 |
| Colour distance d | 0.028 | 0.024 |

Colour coordinates (CIELAB) in transmission

|  |  |  |
|---|---|---|
| L* | 15.7 | 13.4 |
| a* | 5.2 | 4.5 |
| b* | 0.1 | −1.1 |
| c* | 5.2 | 4.7 |
| Flatness of transmission (wavelength at max./min.) | 2.2 630/545 | 1.6 630/552 |

Scatter, thickness 4 mm, D65 standard light, 2°

|  |  |  |
|---|---|---|
| Visual assessment | 1 | 1 |
| Haze | 0.4 | 2.3 |

Thermal expansion

|  |  |  |
|---|---|---|
| $\alpha_{20/300}$ |  |  |
| $\alpha_{20/700}$ |  |  |

X-ray diffraction

|  |  |  |
|---|---|---|
| Main crystal phase | HQMC | HQMC |

Dopants and properties of inventive glass ceramics

| | | Example No. | | | | | | |
|---|---|---|---|---|---|---|---|---|
| | | 9 | 10 | 11 | 12 | 13 | 14 | 15 |
| Glass No. | | 6 | 7 | 8 | 8 | 9 | 10 | 11 |
| Base glass | | 1 | 1 | 1 | 1 | 1 | 1 | 1 |

Dopants (% by wt.)

| | | 9 | 10 | 11 | 12 | 13 | 14 | 15 |
|---|---|---|---|---|---|---|---|---|
| $Fe_2O_3$ | | 0.088 | 0.017 | 0.086 | 0.086 | 0.090 | 0.084 | 0.062 |
| $V_2O_5$ | | | | | | | | |
| $MoO_3$ | | 0.170 | 0.170 | 0.013 | 0.013 | 0.057 | 0.150 | 0.150 |
| $MnO_2$ | | 0.025 | | 0.025 | 0.025 | 0.025 | 0.025 | 0.025 |
| $Cr_2O_3$ | | | | | | | | |
| $CeO_2$ | | | | | | | | |
| $WO_3$ | | | | | | | | |
| Addition to batch | | 50% shards | | | | | 0.1% sugar without nitrate | |
| Ceramization program | # | 3 | 1 | 1 | 3 | 1 | 1 | 1 |

Properties in ceramized form
Transmission, thickness 4 mm, D65 standard light, 2°

| | | 9 | 10 | 11 | 12 | 13 | 14 | 15 |
|---|---|---|---|---|---|---|---|---|
| 470 nm | % | 0.4 | 0.8 | 41.6 | 33.5 | 16.7 | 0.12 | 1.2 |
| 630 nm | % | 0.5 | 0.6 | 58.1 | 43.7 | 21.7 | 0.07 | 1.9 |
| 950 nm | % | 27.0 | 28.9 | 75.5 | 73.0 | 62.1 | 11.2 | 36.7 |
| 1600 nm | % | 60.1 | 75.3 | 77.1 | 76.3 | 75.1 | 56.9 | 71.5 |
| 3700 nm | % | 56.2 | 48.5 | 52.4 | 56.1 | 51.0 | 48.7 | 52.4 |

Colour coordinates (CIE) in transmission

| | | 9 | 10 | 11 | 12 | 13 | 14 | 15 |
|---|---|---|---|---|---|---|---|---|
| x | | 0.341 | 0.290 | 0.344 | 0.3401 | 0.337 | 0.271 | 0.323 |
| y | | 0.322 | 0.275 | 0.357 | 0.3553 | 0.339 | 0.264 | 0.305 |
| Brightness Y | % | 0.3 | 0.5 | 50.1 | 38.2 | 17.6 | 0.1 | 1.4 |
| Colour distance d | | 0.029 | 0.059 | 0.042 | 0.038 | 0.026 | 0.077 | 0.026 |

Colour coordinates (CIELAB) in transmission

| | | 9 | 10 | 11 | 12 | 13 | 14 | 15 |
|---|---|---|---|---|---|---|---|---|
| L* | | 3.2 | 4.3 | 76.2 | 68.2 | 49.0 | 0.6 | 11.7 |
| a* | | 1.5 | 2.0 | 2.1 | 0.9 | 4.3 | 0.2 | 4.3 |
| b* | | 0.2 | −3.4 | 13.3 | 11.1 | 4.8 | −0.6 | −1.8 |
| c* | | 1.6 | 3.9 | 13.5 | 11.1 | 6.4 | 0.7 | 4.7 |
| Flatness of transmission (wavelength at max./min.) | nm | 1.8 630/552 | 1.9 630/567 | 1.4 630/470 | 1.3 630/470 | 1.3 630/524 | 2.4 470/580 | 1.6 630/553 |

TABLE 2-continued

| Scatter, thickness 4 mm, D65 standard light, 2° | | | | | | | | |
|---|---|---|---|---|---|---|---|---|
| Visual assessment | | 3 | 1 | 1 | 3 | 1 | 1 | 1 |
| Haze | % | 9.2 | 0.8 | 1.7 | 10.7 | 1.3 | 2.6 | 0.5 |
| Thermal expansion | | | | | | | | |
| $\alpha_{20/300}$ | $10^{-6}$/K | 0.56 | | | −0.24 | | | |
| $\alpha_{20/700}$ | $10^{-6}$/K | | | | 0.70 | 0.16 | | |
| X-ray diffraction | | | | | | | | |
| Main crystal phase | | KMK | HQMC | HQMC | KMK | HQMC | HQMC | HQMC |

Dopants and properties of inventive glass ceramics and comparative glass ceramic 17.

| | | Example No. | | | | | | |
|---|---|---|---|---|---|---|---|---|
| | | 16 | 17 | 18 | 19 | 20 | 21 | 22 |
| Glass No. | | 11 | 12 | 13 | 13 | 14 | 15 | 15 |
| Base glass | | 1 | 1 | 1 | 1 | 1 | 1 | 1 |
| Dopants (% by wt.) | | | | | | | | |
| $Fe_2O_3$ | | 0.062 | 0.080 | 0.062 | 0.062 | 0.061 | 0.062 | 0.062 |
| $V_2O_5$ | | | 0.010 | | | | | |
| $MoO_3$ | | 0.150 | 0.150 | 0.150 | 0.150 | 0.150 | 0.040 | 0.040 |
| $MnO_2$ | | 0.025 | 0.025 | 0.023 | 0.023 | 0.023 | 0.025 | 0.025 |
| $Cr_2O_3$ | | | 0.0036 | | | | | |
| $CeO_2$ | | | | | 0.060 | 0.060 | | |
| $WO_3$ | | | | | | 0.050 | | |
| Addition to batch | | | | | | | 0.2% sugar without nitrate | 0.2% sugar without nitrate |
| Ceramization program | # | 2 | 1 | 1 | 2 | 1 | 1 | 2 |
| Properties in ceramized form | | | | | | | | |
| Transmission, thickness 4 mm, D65 standard light, 2° | | | | | | | | |
| 470 nm | % | 1.5 | 0.3 | 2.6 | 2.3 | 2.4 | 4.8 | 4.2 |
| 630 nm | % | 1.6 | 1.5 | 3.4 | 2.8 | 2.9 | 2.8 | 2.2 |
| 950 nm | % | 34.2 | 49.3 | 44.5 | 41.8 | 41.6 | 32.1 | 28.9 |
| 1600 nm | % | 70.9 | 70.9 | 73.7 | 73.1 | 73.3 | 75.7 | 74.7 |
| 3700 nm | % | 52.4 | 50.5 | 52.0 | 51.8 | 51.9 | 50.6 | 50.5 |
| Colour coordinates (CIE) in transmission | | | | | | | | |
| x | | 0.315 | 0.490 | 0.341 | 0.331 | 0.329 | 0.268 | 0.260 |
| y | | 0.299 | 0.367 | 0.324 | 0.316 | 0.311 | 0.276 | 0.266 |
| Brightness Y | % | 1.2 | 0.6 | 2.4 | 2.0 | 2.1 | 3.0 | 2.5 |
| Colour distance d | | 0.030 | 0.181 | 0.028 | 0.023 | 0.024 | 0.069 | 0.082 |
| Colour coordinates (CIELAB) in transmission | | | | | | | | |
| L* | | 10.3 | 5.4 | 17.4 | 15.3 | 15.9 | 20.2 | 18.1 |
| a* | | 3.9 | 9.3 | 5.0 | 4.5 | 4.9 | 1.2 | 1.2 |
| b* | | −2.6 | 5.9 | 0.9 | −0.5 | −1.1 | −9.3 | −10.4 |
| c* | | 4.7 | 11.0 | 5.1 | 4.5 | 5.1 | 9.4 | 10.5 |
| Flatness of transmission (wavelength at max./min.) | nm | 1.5 630/558 | 5.7 630/470 | 1.6 630/542 | 1.6 630/549 | 1.6 630/545 | 1.8 470/594 | 2.0 470/601 |
| Scatter, thickness 4 mm, D65 standard light, 2° | | | | | | | | |
| Visual assessment | | 1 | 1 | 1 | 1 | 1 | 1 | 1 |
| Haze | % | 3.1 | 0.8 | 0.5 | 1.0 | 1.0 | 0.8 | 2.1 |
| Thermal expansion | | | | | | | | |
| $\alpha_{20/300}$ | $10^{-6}$/K | | −0.23 | −0.21 | −0.27 | −0.25 | −0.27 | −0.32 |
| $\alpha_{20/700}$ | $10^{-6}$/K | | 0.17 | 0.17 | 0.11 | 0.15 | 0.14 | 0.09 |
| X-ray diffraction | | | | | | | | |
| Main crystal phase | | HQMC | HQMC | HQMC | HQMC | HQMC | HQMC | HQMC |

Dopants and properties of inventive glass ceramics and comparative glass ceramic 27.

| | | Example No. | | | | | | |
|---|---|---|---|---|---|---|---|---|
| | | 23 | 24 | 25 | 26 | 27 | 28 | 29 |
| Glass No. | | 16 | 16 | 17 | 18 | 19 | 20 | 21 |
| Base glass | | 1 | 1 | 1 | 1 | 1 | 1 | 1 |

TABLE 2-continued

| Dopants (% by wt.) | | | | | | | | |
|---|---|---|---|---|---|---|---|---|
| $Fe_2O_3$ | | 0.062 | 0.062 | 0.061 | 0.062 | 0.062 | 0.062 | 0.061 |
| $V_2O_5$ | | | | | | | | |
| $MoO_3$ | | 0.015 | 0.015 | 0.019 | 0.014 | 0.150 | 0.150 | 0.150 |
| $MnO_2$ | | 0.025 | 0.025 | 0.025 | 0.025 | 0.025 | 0.025 | 0.025 |
| CoO | | | | | | | | 0.020 |
| $Cr_2O_3$ | | | | | | 0.020 | | |
| $Nd_2O_3$ | | | | | | 0.042 | | |
| NiO | | | | | | | 0.027 | |
| Addition to batch | | | | 0.1% sugar without nitrate | | | | |
| Ceramization program | # | 1 | 2 | 1 | 1 | 1 | 1 | 1 |
| Properties in ceramized form | | | | | | | | |
| Transmission, thickness 4 mm, D65 standard light, 2° | | | | | | | | |
| 470 nm | % | 42.6 | 43.4 | 22.2 | 42.8 | 0.3 | 1.6 | 2.0 |
| 630 nm | % | 53.4 | 52.7 | 21.2 | 54.2 | 2.6 | 2.1 | 2.0 |
| 950 nm | % | 76.4 | 75.9 | 57.4 | 76.5 | 43.5 | 36.6 | 39.7 |
| 1600 nm | % | 80.8 | 80.4 | 78.1 | 80.8 | 73.1 | 63.8 | 66.7 |
| 3700 nm | % | 53.6 | 53.4 | 50.5 | 53.2 | 51.9 | 50.8 | 50.4 |
| Colour coordinates (CIE) in transmission | | | | | | | | |
| x | | 0.335 | 0.332 | 0.311 | 0.334 | 0.475 | 0.341 | 0.315 |
| y | | 0.348 | 0.345 | 0.326 | 0.348 | 0.452 | 0.309 | 0.257 |
| Brightness Y | % | 47.6 | 47.4 | 20.4 | 47.8 | 1.5 | 1.3 | 1.2 |
| Colour distance d | | 0.029 | 0.025 | 0.003 | 0.029 | 0.204 | 0.035 | 0.072 |
| Colour coordinates (CIELAB) in transmission | | | | | | | | |
| L* | | 74.6 | 74.5 | 52.3 | 74.7 | 12.5 | 11.3 | 10.2 |
| a* | | 1.5 | 1.4 | 0.2 | 1.4 | 4.2 | 6.0 | 9.9 |
| b* | | 9.0 | 7.6 | -0.8 | 8.9 | 18.1 | -0.6 | -6.9 |
| c* | | 9.1 | 7.8 | 0.8 | 9.0 | 18.5 | 6.1 | 12.1 |
| Flatness of transmission (wavelength at max./min.) | nm | 1.3 630/470 | 1.2 630/470 | 1.1 470/572 | 1.3 630/470 | 7.8 630/470 | 2.0 630/538 | 2.4 630/546 |
| Scatter, thickness 4 mm, D65 standard light, 2° | | | | | | | | |
| Visual assessment | | 1 | 1 | 1 | 1 | 1 | 1 | 1 |
| Haze | % | 1.9 | 1.6 | 2.7 | | 0.6 | 0.6 | 0.7 |
| Thermal expansion ($10^{-6}$/K) | | | | | | | | |
| $\alpha_{20/300}$ | | -0.24 | -0.28 | -0.24 | -0.21 | | -0.23 | -0.23 |
| $\alpha_{20/700}$ | | 0.16 | 0.09 | 0.14 | 0.16 | | 0.17 | 0.15 |
| X-ray diffraction | | | | | | | | |
| Main crystal phase | | HQMC | HQMC | HQMC | HQMC | HQMC | HQMC | HQMC |

TABLE 3

Compositions and properties of crystallizable glasses and comparative glass No. 22

| | | Glass No. | | | | | |
|---|---|---|---|---|---|---|---|
| | % by wt. | 22 | 23 | 24 | 25 | 26 | 27 |
| Composition | | | | | | | |
| $Li_2O$ | | 3.83 | 3.65 | 3.82 | 3.83 | 3.79 | 3.71 |
| $Na_2O$ | | 0.57 | 0.56 | 0.60 | 0.61 | 0.60 | 0.46 |
| $K_2O$ | | 0.21 | 0.09 | 0.27 | 0.27 | 0.26 | 0.14 |
| MgO | | 0.19 | 0.27 | 0.30 | 0.30 | 0.29 | 0.98 |
| CaO | | 0.36 | 0.39 | 0.43 | 0.43 | 0.43 | |
| SrO | | | 0.05 | 0.02 | 0.02 | 0.02 | |
| BaO | | 2.41 | 0.88 | 2.22 | 2.21 | 2.23 | |
| ZnO | | 1.41 | 1.7 | 1.52 | 1.49 | 1.47 | 1.58 |
| $Al_2O_3$ | | 20.2 | 21.4 | 20.9 | 20.9 | 21.0 | 20.9 |
| $SiO_2$ | | 65.8 | 66.8 | 64.8 | 64.8 | 65.0 | 67.5 |
| $TiO_2$ | | 3.02 | 2.23 | 4.10 | 3.14 | 3.05 | 2.47 |
| $ZrO_2$ | | 1.39 | 1.83 | 0.43 | 1.40 | 1.40 | 1.69 |
| $P_2O_5$ | | 0.11 | 0.03 | 0.10 | 0.10 | 0.10 | 0.09 |
| $SnO_2$ | | 0.30 | 0.12 | 0.25 | | | 0.23 |

TABLE 3-continued

|  |  |  |  |  |  | 0.28 | 0.15 |  |
|---|---|---|---|---|---|---|---|---|
| $As_2O_3$ |  |  |  |  |  | 0.28 | 0.15 |  |
| $Fe_2O_3$ |  |  | 0.090 | 0.014 | 0.061 | 0.062 | 0.061 | 0.0600 |
| $V_2O_5$ |  |  | 0.016 |  |  |  |  |  |
| $MoO_3$ |  |  |  | 0.007 | 0.150 | 0.150 | 0.150 | 0.1500 |
| $MnO_2$ |  |  | 0.021 |  | 0.024 | 0.025 | 0.025 | 0.024 |
| CoO |  |  | 0.027 |  |  |  |  |  |
| Addition to batch | (% by wt.) |  |  |  |  |  | 0.2% sugar without nitrate |  |
| Properties in glass form |  |  |  |  |  |  |  |  |
| Transformation temperature $T_g$ | °C. |  |  | 685 | 667 | 671 | 672 | 674 |
| $10^2$ temperature | °C. |  |  | 1743 |  |  |  | 1729 |
| Working temperature $V_A$ | °C. |  | 1313 | 1314 | 1294 | 1297 | 1301 | 1310 |
| UDL temperature | °C. |  |  | 1280 |  |  |  | 1280 |

Compositions and properties of crystallizable glasses

|  |  | Glass No. | | | |
|---|---|---|---|---|---|
|  | % by wt. | 28 | 29 | 30 | 31 |
| Composition |  |  |  |  |  |
| $Li_2O$ |  | 4.03 | 3.82 | 3.31 | 3.30 |
| $Na_2O$ |  | 0.42 | 0.60 | 0.37 | 0.36 |
| $K_2O$ |  | 0.40 | 0.26 | 0.36 | 0.36 |
| MgO |  | 0.77 | 0.30 | 0.56 | 0.56 |
| CaO |  |  | 0.43 | 0.58 | 0.58 |
| SrO |  |  | 0.02 |  | 0.01 |
| BaO |  | 0.39 | 2.23 | 1.62 | 1.63 |
| ZnO |  | 0.56 | 1.48 | 1.92 | 1.90 |
| $Al_2O_3$ |  | 20.1 | 21 | 21.4 | 21.4 |
| $SiO_2$ |  | 68.0 | 64.5 | 64.8 | 64.7 |
| $TiO_2$ |  | 4.69 | 3.08 | 3.20 | 4.02 |
| $ZrO_2$ |  |  | 1.40 | 1.35 | 0.68 |
| $P_2O_5$ |  | 0.11 | 0.56 | 0.04 | 0.03 |
| $SnO_2$ |  | 0.24 | 0.23 | 0.24 | 0.22 |
| $As_2O_3$ |  |  |  |  |  |
| $Fe_2O_3$ |  | 0.062 | 0.062 | 0.099 | 0.100 |
| $V_2O_5$ |  |  |  |  |  |
| $MoO_3$ |  | 0.140 | 0.040 | 0.160 | 0.149 |
| $MnO_2$ |  |  | 0.025 |  |  |
| $Nd_2O_3$ |  |  |  |  |  |
| Addition to batch | (% by wt.) |  | 0.07% S |  |  |
| Properties in glass form |  |  |  |  |  |
| Transformation temperature $T_g$ | °C. | 670 | 668 | 675 | 670 |
| $10^2$ temperature | °C. |  |  | 1733 |  |
| Working temperature $V_A$ | °C. | 1319 | 1299 | 1300 | 1295 |
| UDL temperature | °C. |  |  | 1275 |  |

|  |  | Glass No. | | | | |
|---|---|---|---|---|---|---|
|  | % by wt. | 32 | 33 | 34 | 35 | 36 |
| Composition |  |  |  |  |  |  |
| $Li_2O$ |  | 2.67 | 4.13 | 3.22 | 3.67 | 3.73 |
| $Na_2O$ |  | 0.54 | 0.64 | 0.78 | 0.77 | 0.78 |
| $K_2O$ |  | 0.24 | 0.29 | 0.20 | 0.21 | 0.58 |
| MgO |  | 1.73 | 0.24 | 0.81 | 0.77 | 0.20 |
| CaO |  | 0.69 | 0.52 | 0.21 | 0.21 | 0.21 |
| SrO |  |  | 0.02 |  |  |  |
| BaO |  | 1.97 | 2.05 | 2.42 | 0.68 | 2.41 |
| ZnO |  | 1.65 |  | 1.16 | 0.90 | 0.93 |
| $Al_2O_3$ |  | 20.0 | 21.7 | 19.8 | 22.2 | 20.0 |
| $SiO_2$ |  | 64.9 | 65.8 | 66.9 | 65.4 | 66.4 |
| $TiO_2$ |  | 5.04 | 3.58 | 2.68 | 4.26 | 2.83 |
| $ZrO_2$ |  |  | 0.64 | 1.44 | 0.54 | 1.40 |
| $P_2O_5$ |  | 0.07 | 0.03 |  |  |  |
| $SnO_2$ |  | 0.24 | 0.25 | 0.20 | 0.19 | 0.39 |
| $As_2O_3$ |  |  |  |  |  |  |
| $Fe_2O_3$ |  | 0.091 | 0.065 | 0.110 | 0.085 | 0.033 |
| $V_2O_5$ |  |  |  |  |  |  |
| $MoO_3$ |  | 0.099 | 0.026 | 0.043 | 0.079 | 0.045 |

TABLE 3-continued

| | | | | | | |
|---|---|---|---|---|---|---|
| MnO₂ | | | 0.018 | | | |
| Addition to batch | (% by wt.) | | | | 0.1% sugar without nitrate | 0.2% sugar without nitrate |
| Properties in glass form | | | | | | |
| Transformation temperature Tg | ° C. | 671 | 685 | 680 | 675 | 674 |
| 10² temperature | ° C. | | 1774 | 1770 | 1693 | 1770 |
| Working temperature $V_A$ | ° C. | 1296 | 1327 | 1331 | 1294 | 1331 |
| UDL temperature | ° C. | 1265 | 1255 | 1260 | | |

TABLE 4

Properties of inventive glass ceramics and comparative glass ceramic of Example 30

| | | Example No. | | | | | | |
|---|---|---|---|---|---|---|---|---|
| | | 30 | 31 | 32 | 33 | 34 | 35 | 36 |
| Glass No. | | 22 | 23 | 24 | 25 | 26 | 27 | 28 |
| Ceramization program | | 2 | 1 | 1 | 1 | 1 | 2 | 1 |
| Properties in ceramized form | | | | | | | | |
| Transmission, thickness 4 mm, D65 standard light, 2° | | | | | | | | |
| 470 nm | % | 1.9 | 74.2 | 0.9 | 43.4 | 39.4 | 2.5 | 0.8 |
| 630 nm | % | 10.8 | 83.6 | 0.6 | 57.1 | 52.3 | 7.8 | 1.7 |
| 950 nm | % | 72.0 | 89.3 | 25.6 | 82.2 | 83.1 | 55.4 | 37.6 |
| 1600 nm | % | 67.5 | 89.6 | 73.5 | 82.9 | 82.8 | 70.8 | 73.5 |
| 3700 nm | % | 49.4 | 49.7 | 51.5 | 53.6 | 52.0 | 49.9 | 52.4 |
| Colour coordinates (CIE) in transmission | | | | | | | | |
| x | | 0.476 | 0.323 | 0.276 | 0.342 | 0.342 | 0.414 | 0.393 |
| y | | 0.322 | 0.338 | 0.265 | 0.355 | 0.351 | 0.359 | 0.350 |
| Brightness Y | % | 3.5 | 79.5 | 0.5 | 48.7 | 43.7 | 4.2 | 1.0 |
| Colour distance d | | 0.163 | 0.011 | 0.089 | 0.024 | 0.037 | 0.106 | 0.083 |
| Colour coordinates (CIELAB) in transmission | | | | | | | | |
| L* | | 21.9 | 91.4 | 4.5 | 75.3 | 72.0 | 24.2 | 8.7 |
| a* | | 25.8 | 0.8 | 1.8 | 1.8 | 3.1 | 11.6 | 6.1 |
| b* | | 11.0 | 5.2 | −4.5 | 12.3 | 10.8 | 11.4 | 4.9 |
| c* | | 28.0 | 5.3 | 4.9 | 12.5 | 11.2 | 16.3 | 7.8 |
| Flatness of transmission (wavelength at max./min.) | nm | 8.0 630/504 | 1.1 630/470 | 2.1 470/571 | 1.3 630/470 | 1.3 630/470 | 3.1 630/470 | 2.3 630/509 |
| Scatter, thickness 4 mm, D65 standard light, 2° | | | | | | | | |
| Visual assessment | | 1 | 1 | 1 | 1 | 1 | 1 | 1 |
| Haze | % | 0.2 | 1.3 | 3.3 | 2.0 | 1.4 | 0.8 | 0.1 |
| Thermal expansion | | | | | | | | |
| $α_{20/300}$ | 10⁻⁶/K | −0.40 | −0.74 | −0.13 | −0.24 | −0.27 | −0.45 | −0.14 |
| $α_{20/700}$ | 10⁻⁶/K | −0.03 | −0.39 | 0.23 | 0.16 | 0.12 | −0.15 | 0.14 |
| X-ray diffraction | | | | | | | | |
| Main crystal phase | | HQMC | HQMC | HQMC | HQMC | HQMC | HQMC | HQMC |

Properties of inventive glass ceramics

| | | Example No. | | | |
|---|---|---|---|---|---|
| | | 37 | 38 | 39 | 40 |
| Glass No. | | 29 | 30 | 30 | 31 |
| Ceramization program | | 1 | 1 | 2 | 1 |
| Properties in ceramized form | | | | | |
| Transmission, thickness 4 mm, D65 standard light | | | | | |
| 470 nm | % | 1.8 | 5.8 | 5.2 | 0.6 |
| 630 nm | % | 0.6 | 8.3 | 7.0 | 1.0 |
| 950 nm | % | 18.6 | 53.4 | 50.9 | 28.2 |
| 1600 nm | % | 73.2 | 69.1 | 68.1 | 66.1 |
| 3700 nm | % | 49.2 | 46.3 | 46.4 | 47.8 |

TABLE 4-continued

| | | | | | |
|---|---|---|---|---|---|
| Colour coordinates (CIE) in transmission | | | | | |
| x | | 0.234 | 0.344 | 0.338 | 0357 |
| y | | 0.238 | 0.325 | 0.320 | 0.331 |
| Brightness Y | % | 0.9 | 5.9 | 5.0 | 0.6 |
| Colour distance d | | 0.120 | 0.032 | 0.027 | 0.044 |
| Colour coordinates (CIELAB) in transmission | | | | | |
| L* | | 7.9 | 29.1 | 26.8 | 5.6 |
| a* | | 1.2 | 7.1 | 6.5 | 3.2 |
| b* | | −11.0 | 1.7 | 0.4 | 1.3 |
| c* | | 11.1 | 7.3 | 6.5 | 3.5 |
| Flatness of transmission (wavelength at max./min.) | nm | 2.9 470/609 | 1.6 630/527 | 1.6 630/536 | 1.8 630/533 |
| Scatter, thickness 4 mm, D65 standard light, 2° | | | | | |
| Visual assessment | | 1 | 1 | 1 | 1 |
| Haze | % | 0.2 | 0.6 | 3.4 | 0.3 |
| Thermal expansion | | | | | |
| $\alpha_{20/300}$ | $10^{-6}$/K | −0.28 | 0.05 | 0.00 | 0.30 |
| $\alpha_{20/700}$ | $10^{-6}$/K | 0.12 | 0.34 | 0.27 | 0.55 |
| X-ray diffraction | | | | | |
| Main crystal phase | | HQMC | HQMC | HQMC | HQMC |

| | | Example No. | | | | |
|---|---|---|---|---|---|---|
| | | 41 | 42 | 43 | 44 | 45 |
| Glass No. | | 32 | 33 | 34 | 35 | 36 |
| Ceramization program | | 2 | 1 | 2 | 2 | 2 |
| Properties in ceramized form | | | | | | |
| Transmission, thickness 4 mm, D65 standard light, 2° | | | | | | |
| 470 nm | % | 0.7 | 12.1 | 33.2 | 1.9 | 12.5 |
| 630 nm | % | 1.4 | 27.4 | 46.1 | 2.8 | 10.8 |
| 950 nm | % | 34.6 | 54.0 | 71.6 | 33.1 | 51.8 |
| 1600 nm | % | 71.3 | 72.1 | 72.3 | 69.9 | 82.7 |
| 3700 nm | % | 44.3 | 49.9 | 46.1 | 47.7 | 47.0 |
| Colour coordinates (CIE) in transmission | | | | | | |
| x | | 0.389 | 0.389 | 0.342 | 0.350 | 0.302 |
| y | | 0.366 | 0.385 | 0.348 | 0.347 | 0.313 |
| Brightness Y | % | 0.9 | 19.6 | 38.5 | 2.1 | 10.3 |
| Colour distance d | | 0.085 | 0.095 | 0.035 | 0.041 | 0.019 |
| Colour coordinates (CIELAB) in transmission | | | | | | |
| L* | | 8.1 | 51.4 | 68.4 | 16.0 | 38.4 |
| a* | | 4.0 | 5.9 | 4.3 | 2.8 | 1.3 |
| b* | | 5.3 | 21.7 | 9.4 | 3.9 | −3.9 |
| c* | | 6.7 | 22.5 | 10.3 | 4.8 | 4.1 |
| Flatness of transmission (wavelength at max./min.) | nm | 2.1 630/470 | 2.3 630/470 | 1.4 630/470 | 1.5 630/470 | 1.3 470/575 |
| Scatter, thickness 4 mm, D65 standard light, 2° | | | | | | |
| Visual assessment | | 1 | 2 | 1 | 1 | 1 |
| Haze | % | 2.5 | | 1.1 | 2.9 | 1.1 |
| Thermal expansion | | | | | | |
| $\alpha_{20/300}$ | $10^{-6}$/K | 1.23 | −0.37 | 0.32 | 0.23 | −0.14 |
| $\alpha_{20/700}$ | $10^{-6}$/K | 1.49 | 0.01 | 0.59 | 0.51 | 0.26 |
| X-ray diffraction | | | | | | |
| Main crystal phase | | HQMC | HQMC | HQMC | HQMC | HQMC |

What is claimed is:

1. A transparent coloured lithium aluminium silicate glass ceramic, comprising:
   a brightness Y of 0.1% to 80% at thickness 4 mm;
   a colouring component of greater than 0.04-0.5% by weight of $MoO_3$; and
   a D65 standard illuminant light has a colour locus in the white region W1 determined by coordinates in a chromaticity diagram CIExyY-2°:

| White region W1 | |
|---|---|
| X | Y |
| 0.27 | 0.21 |
| 0.22 | 0.25 |
| 0.32 | 0.37 |
| 0.45 | 0.45 |
| 0.47 | 0.34 |
| 0.36 | 0.29. |

2. The lithium aluminium silicate glass ceramic of claim 1, wherein the colouring component further comprises an $SnO_2$ content of 0.05-0.8% by weight.

3. The lithium aluminium silicate glass ceramic of claim 2, comprising less than 0.2% by weight of $Nd_2O_3$.

4. The lithium aluminium silicate glass ceramic of claim 1, comprising a $V_2O_5$ content of less than 0.015% by weight.

5. The lithium aluminium silicate glass ceramic of claim 4, comprising an $SnO_2$ content of 0.05-0.8% by weight.

6. The lithium aluminium silicate glass ceramic of claim 1, comprising a chroma c* in a CIELAB colour system, measured in transmission with D65 standard light, 2°, at a thickness of 4 mm, that is not more than 21.

7. The lithium aluminium silicate glass ceramic of claim 1, comprising transmission curve with a flat profile, wherein the transmission curve has a ratio of a highest transmission value to a lowest transmission value within a wavelength range from 470 to 630 nm that is not more than 2.5.

8. The lithium aluminium silicate glass ceramic of claim 1, comprising an infrared transmission of 45-85% at a wavelength of 1600 nm and a thickness of 4 mm.

9. The lithium aluminium silicate glass ceramic of claim 1, comprising a material selected from a group consisting of an $Fe_2O_3$ content of 0.005-0.25% by weight, a $TiO_2$ content of more than 1.6% by weight, a $ZrO_2$ content of 0.3-<2.2% by weight, and any combinations thereof.

10. The lithium aluminium silicate glass ceramic of claim 1, comprising, in % by weight based on oxide:

| | |
|---|---|
| $Li_2O$ | 2-5.5; |
| $Al_2O_3$ | 16-26; |
| $SiO_2$ | 58-72; and |
| $MoO_3$ | greater than 0.003-0.5. |

11. The lithium aluminium silicate glass ceramic of claim 1, consisting essentially of, in % by weight based on oxide:

| | |
|---|---|
| $Li_2O$ | 3-5; |
| $\Sigma Na_2O + K_2O$ | 0.1-<4; |
| MgO | 0-3; |
| $\Sigma CaO + SrO + BaO$ | 0-5; |
| ZnO | 0-4; |
| $B_2O_3$ | 0-3; |
| $Al_2O_3$ | 18-25; |
| $SiO_2$ | 60-70; |
| $TiO_2$ | 1.5-5.5; |
| $ZrO_2$ | 0-2.5; |
| $SnO_2$ | 0.1-<0.7; |
| $\Sigma TiO_2 + ZrO_2 + SnO_2$ | 3-6.5; |
| $P_2O_5$ | 0-5; |
| $MoO_3$ | greater than 0.04-0.3; |
| $Fe_2O_3$ | 0.005-0.025; and |
| $V_2O_5$ | 0-0.02. |

12. The lithium aluminium silicate glass ceramic of claim 1, consisting essentially of, in % by weight based on oxide:

| | |
|---|---|
| $Li_2O$ | 3-5; |
| $\Sigma Na_2O + K_2O$ | 0.2-<3; |
| MgO | 0-1.5; |
| $\Sigma CaO + SrO + BaO$ | 0.2-4; |
| ZnO | 0-3; |
| $B_2O_3$ | 0-2; |
| $Al_2O_3$ | 18-24; |
| $SiO_2$ | 60-69; |
| $TiO_2$ | 1.5-5.5; |
| $ZrO_2$ | 0-2.5; |
| $SnO_2$ | 0.1-<0.7; |
| $\Sigma TiO_2 + ZrO_2 + SnO_2$ | 3.5-6.3; |
| $P_2O_5$ | 0-3; |
| $MoO_3$ | greater than 0.04-0.25; |
| $Fe_2O_3$ | >0.03-0.015; and |
| $V_2O_5$ | 0-<0.01. |

13. The lithium aluminium silicate glass ceramic of claim 1, wherein the glass ceramic does not contain any arsenic oxide or antimony oxide apart from unavoidable impurities.

14. The lithium aluminium silicate glass ceramic of claim 1, comprising high quartz mixed crystals as main crystal phase.

15. The lithium aluminium silicate glass ceramic of claim 1, wherein the lithium aluminium silicate glass ceramic is configured for a use selected from a group consisting of cookware, a stove sightglass, cook ware, a grilling surface, a frying surface, a fire protection glazing, a baking oven sightglass, a pyrolytic cooker, a lighting cover, safety glass, a laminate composite, a carrier plate, and a lining in thermal processes.

16. The lithium aluminium silicate glass ceramic of claim 1, wherein the lithium aluminium silicate glass ceramic is a plate having a thickness of 2.5 to 6 mm and a brightness of 1.2% to <5% in a range of 380 to 780 nm without the use of applied colour filters or layers for correction of the colour locus of the light transmitted to provide a dark-coloured cooking surface.

17. The lithium aluminium silicate glass ceramic of claim 1, wherein the lithium aluminium silicate glass ceramic is a plate having a thickness of 2.5 to 6 mm and a brightness of 5% to 80% in a range of 380 to 780 nm and comprising a mask executed as an opaque coating on an upper and/or lower side of the plate to provide a coloured cooking surface without the use of applied colour filters or layers for correction of the light transmitted.

18. The lithium aluminium silicate glass ceramic of claim 1, wherein the colouring component further comprises less than 0.2% by weight of $Nd_2O_3$.

19. The lithium aluminium silicate glass ceramic of claim 4, wherein the colouring component further comprises less than 0.2% by weight of $Nd_2O_3$.

20. A transparent coloured lithium aluminium silicate glass ceramic, comprising:

a brightness Y of 0.1% to 80% at a thickness of 4 mm;

a colouring component comprising $MoO_3$ and $SnO_2$; and a D65 standard illuminant light has a colour locus in the white region W1 determined by coordinates in a chromaticity diagram CIExyY-2°:

| White region W1 | |
|---|---|
| X | Y |
| 0.27 | 0.21 |
| 0.22 | 0.25 |
| 0.32 | 0.37 |
| 0.45 | 0.45 |
| 0.47 | 0.34 |
| 0.36 | 0.29. |

21. The lithium aluminium silicate glass ceramic of claim 20, wherein the $SnO_2$ has a content of 0.05-0.8% by weight.

22. The lithium aluminium silicate glass ceramic of claim 20, wherein the $MoO_3$ has a content of 0.003-0.5% by weight.

23. The lithium aluminium silicate glass ceramic of claim 20, wherein the brightness Y is from 0.1% to less than 50% at the thickness of 4 mm.

24. A transparent coloured lithium aluminium silicate glass ceramic, comprising:

a colouring component comprising $MoO_3$;

a brightness Y of 0.1% to 20% at a thickness of 4 mm; and a D65 standard illuminant light has a colour locus in the white region W1 determined by coordinates in a chromaticity diagram CIExyY-2°:

| White region W1 | |
|---|---|
| X | Y |
| 0.27 | 0.21 |
| 0.22 | 0.25 |
| 0.32 | 0.37 |
| 0.45 | 0.45 |
| 0.47 | 0.34 |
| 0.36 | 0.29. |

25. A transparent coloured lithium aluminium silicate glass ceramic, comprising:

a brightness Y of 0.1% to 80% at a thickness of 4 mm;

0.005-0.15% by weight of $Fe_2O_3$;

$MoO_3$; and a D65 standard illuminant light has a colour locus in the white region W1 determined by coordinates in a chromaticity diagram CIExyY-2°:

| White region W1 | |
|---|---|
| X | Y |
| 0.27 | 0.21 |
| 0.22 | 0.25 |
| 0.32 | 0.37 |
| 0.45 | 0.45 |
| 0.47 | 0.34 |
| 0.36 | 0.29. |

26. The lithium aluminium silicate glass ceramic of claim 25, wherein the brightness Y is 20% to 50% at the thickness of 4 mm.

27. The lithium aluminium silicate glass ceramic of claim 24, wherein the colouring component further comprises an $SnO_2$ content of 0.1 to <0.5% by weight.

* * * * *